(12) United States Patent
Ehasoo et al.

(10) Patent No.: US 11,738,867 B2
(45) Date of Patent: Aug. 29, 2023

(54) DRONE ROUTING COMBINING AUTONOMOUS FLIGHT AND ASSIST VEHICLE TRAVEL

(71) Applicants: Ronan Xavier Ehasoo, Etobicoke (CA); Stuart Leslie Wilkinson, Etobicoke (CA)

(72) Inventors: Ronan Xavier Ehasoo, Etobicoke (CA); Stuart Leslie Wilkinson, Etobicoke (CA)

( * ) Notice: Subject to any disclaimer, the term of this patent is extended or adjusted under 35 U.S.C. 154(b) by 0 days.

(21) Appl. No.: 17/877,926

(22) Filed: Jul. 30, 2022

(65) Prior Publication Data

US 2023/0031028 A1    Feb. 2, 2023

Related U.S. Application Data

(60) Provisional application No. 63/351,348, filed on Jun. 11, 2022, provisional application No. 63/227,691, filed on Jul. 30, 2021.

(51) Int. Cl.
*B64C 39/02* (2023.01)
*B64F 1/22* (2006.01)
(Continued)

(52) U.S. Cl.
CPC .......... *B64C 39/024* (2013.01); *B60L 5/18* (2013.01); *B60L 5/38* (2013.01); *B60L 53/00* (2019.02); *B64F 1/10* (2013.01); *B64F 1/222* (2013.01); *B60L 2200/10* (2013.01); *B60P 3/11* (2013.01); *B64C 29/0008* (2013.01); *B64U 30/20* (2023.01); *B64U 50/19* (2023.01); *B64U 70/00* (2023.01); *B64U 80/82* (2023.01); *B64U 80/84* (2023.01); *B64U 80/86* (2023.01); *B64U 2101/60* (2023.01); *B64U 2201/10* (2023.01)

(58) Field of Classification Search
CPC ..... B64C 39/024; B64C 29/0008; B60L 5/18; B60L 5/38; B60L 53/00; B60L 2200/10; B64F 1/10; B64F 1/222; B60P 3/11; B64U 30/20; B64U 50/19; B64U 70/00; B64U 80/82; B64U 80/84; B64U 80/86; B64U 2101/60; B64U 2201/10; Y02T 10/70

See application file for complete search history.

(56) References Cited

U.S. PATENT DOCUMENTS 2,774,557 A * 12/1956 Jakimiuk ............ B64F 1/10
                                                  244/63
4,123,020 A * 10/1978 Korsak ............ B64F 1/125
                                                  244/116
(Continued)

FOREIGN PATENT DOCUMENTS

GB    2564291 A    1/2019
GB    2565383 A    2/2019
(Continued)

*Primary Examiner* — Medhat Badawi

(57) ABSTRACT

A system comprises a drone having autonomous drive capability and an assist vehicle (AV) for transporting the drone in an assisted drive mode in which the drone is held at, and transported by, the assist vehicle. Control hardware and software are programmed to determine drone travel over a route having a first route section in which the drone travels autonomously and a second route section in which the drone travels in the assisted drive mode.

21 Claims, 12 Drawing Sheets

(51) Int. Cl.
  *B60L 5/38* (2006.01)
  *B60L 5/18* (2006.01)
  *B60L 53/00* (2019.01)
  *B64F 1/10* (2006.01)
  *B64C 29/00* (2006.01)
  *B60P 3/11* (2006.01)
  *B64U 30/20* (2023.01)
  *B64U 50/19* (2023.01)
  *B64U 70/00* (2023.01)
  *B64U 80/82* (2023.01)
  *B64U 80/84* (2023.01)
  *B64U 80/86* (2023.01)
  *B64U 101/60* (2023.01)

(56) References Cited

U.S. PATENT DOCUMENTS

| | | | | |
|---|---|---|---|---|
| 5,109,788 | A * | 5/1992 | Heinzmann | B63B 35/52 114/261 |
| 5,150,860 | A * | 9/1992 | Young | B64F 1/10 244/50 |
| 7,619,319 | B1 * | 11/2009 | Hunter | B60L 53/14 290/4 R |
| 8,453,967 | B2 * | 6/2013 | Miller | F41J 13/00 244/110 F |
| 8,464,981 | B2 * | 6/2013 | Goldie | B64C 39/024 244/110 G |
| 8,511,606 | B1 * | 8/2013 | Lutke | B64C 39/024 320/109 |
| 8,567,718 | B1 * | 10/2013 | McDonnell | B64F 1/10 244/110 G |
| 9,718,564 | B1 * | 8/2017 | Beckman | B64F 5/40 |
| 9,969,505 | B2 * | 5/2018 | McKee | G05D 1/021 |
| 10,421,542 | B2 * | 9/2019 | Beckman | G08G 5/0069 |
| 10,453,348 | B2 * | 10/2019 | Speasl | B64U 80/82 |
| 10,538,340 | B1 * | 1/2020 | Roup | G08G 5/0026 |
| 10,571,930 | B2 * | 2/2020 | Coleman | B60P 3/11 |
| 10,625,859 | B2 * | 4/2020 | Beckman | G06Q 10/0838 |
| 10,657,485 | B2 * | 5/2020 | Burch, V | G01S 5/0018 |
| 10,730,626 | B2 * | 8/2020 | Gil | G08G 5/006 |
| 11,168,487 | B2 * | 11/2021 | Wankewycz | E04H 6/44 |
| 11,222,299 | B1 * | 1/2022 | Baalke | G06Q 10/087 |
| 11,308,815 | B2 * | 4/2022 | Speasl | B64F 1/222 |
| 11,367,360 | B2 * | 6/2022 | Speasl | B64U 70/00 |
| 11,373,539 | B2 * | 6/2022 | Speasl | B64U 70/00 |
| 11,455,896 | B2 * | 9/2022 | Speasl | B64F 1/222 |
| 2006/0249622 | A1 * | 11/2006 | Steele | B64F 1/02 244/115 |
| 2009/0152391 | A1 * | 6/2009 | McWhirk | B64B 1/70 244/30 |
| 2009/0294584 | A1 * | 12/2009 | Lovell | B63B 27/10 901/30 |
| 2012/0080556 | A1 * | 4/2012 | Root, Jr. | G01W 1/08 73/170.28 |
| 2013/0325222 | A1 * | 12/2013 | Roh | B64F 1/027 701/18 |
| 2014/0252162 | A1 * | 9/2014 | Teller | B64F 1/10 244/63 |
| 2015/0120094 | A1 * | 4/2015 | Kimchi | G05D 1/00 701/3 |
| 2016/0011592 | A1 * | 1/2016 | Zhang | G05D 1/10 244/114 R |
| 2016/0266578 | A1 * | 9/2016 | Douglas | G05D 1/0282 |
| 2016/0355261 | A1 * | 12/2016 | Chin | B64D 5/00 |
| 2016/0364989 | A1 * | 12/2016 | Speasl | B64U 80/84 |
| 2017/0021942 | A1 * | 1/2017 | Fisher | B64C 39/024 |
| 2017/0023949 | A1 * | 1/2017 | Fisher | G08G 5/0078 |
| 2017/0036762 | A1 * | 2/2017 | Gamble | B64U 10/25 |
| 2017/0096222 | A1 * | 4/2017 | Spinelli | B64C 33/00 |
| 2017/0137150 | A1 * | 5/2017 | Conyers | B64F 1/10 |
| 2017/0144776 | A1 * | 5/2017 | Fisher | B64F 1/04 |
| 2017/0160735 | A1 | 6/2017 | Mikan | |
| 2017/0197725 | A1 * | 7/2017 | Foo | B64C 39/024 |
| 2017/0225799 | A1 * | 8/2017 | Selwyn | B64C 29/02 |
| 2017/0225802 | A1 * | 8/2017 | Lussier | B64F 1/007 |
| 2018/0074518 | A1 * | 3/2018 | Cantrell | G05D 1/102 |
| 2018/0079531 | A1 * | 3/2018 | Bennett | B60L 53/36 |
| 2018/0194267 | A1 * | 7/2018 | Helou, Jr. | B65D 88/022 |
| 2018/0265295 | A1 * | 9/2018 | Beckman | B61L 25/025 |
| 2018/0265296 | A1 * | 9/2018 | Beckman | B61D 3/18 |
| 2019/0377345 | A1 * | 12/2019 | Bachrach | G06V 20/17 |
| 2019/0389580 | A1 * | 12/2019 | Beckman | G06Q 10/08345 |
| 2020/0160728 | A1 * | 5/2020 | Speasl | B64U 80/84 |
| 2020/0286389 | A1 * | 9/2020 | Speasl | B64U 70/00 |
| 2020/0324895 | A1 * | 10/2020 | Ghio | G05D 1/104 |
| 2020/0324934 | A1 * | 10/2020 | Weekes | B65D 7/44 |
| 2020/0349853 | A1 * | 11/2020 | Speasl | G06Q 10/08 |
| 2020/0410872 | A1 * | 12/2020 | Speasl | B64U 70/00 |
| 2021/0053407 | A1 * | 2/2021 | Smith | B25J 9/1697 |
| 2021/0107684 | A1 * | 4/2021 | Le Lann | B64U 80/70 |
| 2023/0031028 | A1 * | 2/2023 | Ehasoo | B64F 1/10 |

FOREIGN PATENT DOCUMENTS

| | | |
|---|---|---|
| WO | 2018065977 A1 | 4/2018 |
| WO | 2019073344 A1 | 4/2019 |

* cited by examiner

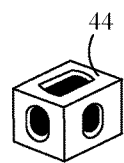
FIG. 18
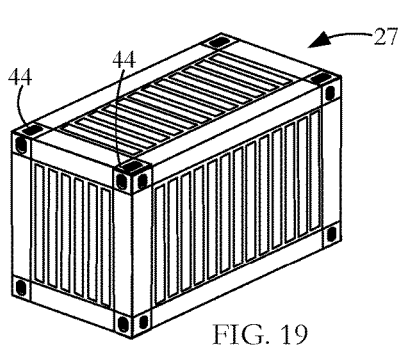
FIG. 19
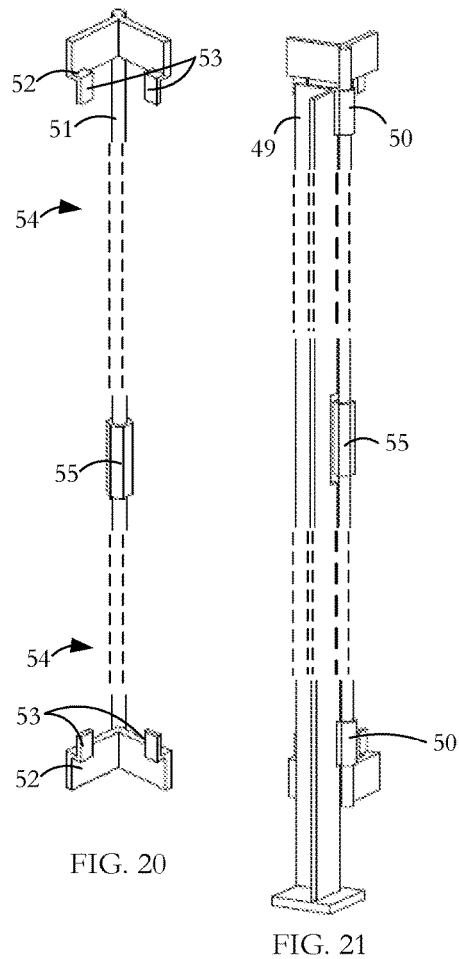
FIG. 20
FIG. 21
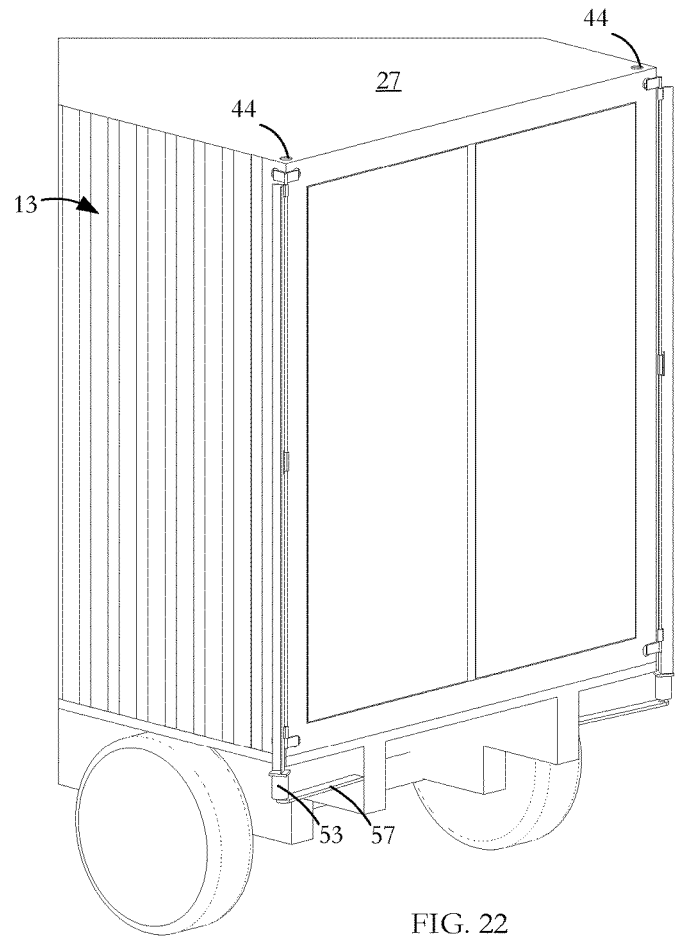
FIG. 22

DRONE ROUTING COMBINING AUTONOMOUS FLIGHT AND ASSIST VEHICLE TRAVEL

CROSS REFERENCE TO RELATED PATENTS

The present application claims priority pursuant to 35 U.S.C. 119(e) from U.S. Provisional Patent Application Ser. No. 63/227,691 filed Jul. 30, 2021 entitled "Drone charging system and method" and U.S. Provisional Patent Application Ser. No. 63/351,348 filed Jun. 11, 2022 entitled "Combined autonomous assisted delivery drone travel".

FIELD OF THE INVENTION

The present invention relates to drones carrying packages. In this specification: the term "package" is intended to cover payload, parcel, material, objects, supplies, etc.; the term "drone" is intended to cover any unmanned aerial vehicles (UAVs) including multi-rotor and vertical take-off and landing (VTOL) aircraft and any such vehicles having a fixed wing to generate lift; the term "autonomous" means moving without the assistance of an assist vehicle (AV).

With an increasing amount of on-line purchasing, the use of drones, particularly package-carrying drones, is expected to proliferate leading to sky congestion. Paralleling this is the proliferation of the ubiquitous 'white van' for package pick-up and delivery, leading to greater road congestion. This is especially the case for 'last mile' delivery, but is a growing problem also for 'first mile' and intervening travel.

SUMMARY OF THE INVENTION

According to one aspect of the invention, a system comprises a drone having autonomous drive capability, an assist vehicle (AV) for transporting the drone in an assisted drive mode, in which the drone is held at, and transported by, the assist vehicle, and control hardware and software for determining drone travel over a route having a first section in which the drone travels autonomously and a second route section in which the drone travels in the assisted drive mode.

The AV can be any of a rail, road, waterborne or airborne vehicle. Preferably, a part of the AV is an ISO intermodal container. The AV can have a drone energy replenishment capability having an energy outlet connectible to an energy inlet to a drone held at the AV.

The AV can be powered by electricity from at least one of an overhead line, a third rail, or a battery with the AV having a circuit to take a part of the electricity to charge the drone when the drone is held at the AV. Alternatively, the AV can be powered by an energy source other than electricity, the system further including a generator for converting a part of energy from the energy source to electricity, and a circuit to take a part of the electricity to charge the drone when held at the AV. Alternatively, the drone can be powered by an energy source other than electricity and the AV has a corresponding energy source and the AV and the AV source can transfer energy to the drone source to the drone when the drone is held at the AV.

An AV that is a road vehicle can be the trailer or tractor unit of a tractor trailer combination. Alternatively, the road vehicle is a general-purpose vehicle such as a pick-up truck or automobile.

Preferably, a drone holder is mounted at the AV. The holder can be mounted on the exterior of the AV or in a bay or compartment in the interior of the AV. A drone launching/landing platform can be mounted at the AV, either separately or as part of the holder. The platform can be mounted on an elevator for moving the platform up and down as convenient or necessary to facilitate drone launching and landing.

Such a bay or compartment can further accommodate a holding mechanism operable to hold a drone and to pull or push it between a first position in the bay to a second position in the bay. The positions can be any of a landing/launching position, a drone storage position, and a drone energy replenishment position.

For a bay or compartment within a container, the bay can be drone-accessible through an aperture in a container panel, such as a roof panel. Preferably, a door covers the aperture in a closed position, the door openable to permit entry and exit of the drone, respectively to and from the bay.

The invention is applicable to drones that are (a) battery powered, (b) powered by a combustible fuel, and (c) hybrid drones (such as hybrids powered by an internal combustion engine for converting combustible fuel to electricity during flight, and hybrids powered by a battery-supercapacitor combination).

According to another aspect of the invention there is provided a system comprising a drone having autonomous drive capability, an assist vehicle (AV) for transporting the drone in an assisted drive mode, in which the drone is located at, and transported by, the AV, a launching and landing platform at the AV, and control hardware and software programmed to sense and compute a position and orientation of the drone on the launching and landing platform.

Preferably, the system further comprises a camera at one of the drone and the platform, and sighting indicia at the other of the drone and the platform, the control hardware and software further programmed to use viewing of the sighting indicia by the camera to guide the drone, when landing on the platform, to a desired position. The system can further comprise a drone holder at the AV, the drone holder, operable under the control of the control hardware and software to grip the drone on the launching and landing platform, and to move the drone to an energy replenishment station.

The system can further comprise a first connector at the drone and a second connector at the energy replenishment station, the control hardware and software further programmed to join the first and second connectors to enable energy replenishment of the drone from the AV.

The system can further comprise a drone holder at the AV, the drone holder, operable under the control of the control hardware and software to grip the drone on the launching and landing platform, and to move the drone to a storage zone.

The system can further comprise a drone holder at the AV, the drone holder, operable under the control of the control hardware and software to grip the drone at a storage zone and to move the drone to the launching and landing platform. Preferably, the AV has a storage volume for storing a plurality of such drones in a plurality of such storage zones. The storage volume can be configured for horizontal and/or vertical stacking of the drones.

Preferably, when one of the drones is subjected to operation of the drone holder under the control of the hardware and software to be gripped on the launching and landing platform and to be moved to one of the storage zone, either the movement does not interfere with any of the other drones stored in any other of the storage zones or means are provided to alter storage configuration to allow such movement.

Preferably the control hardware and software is configured to determine drone travel over a route having a first section in which the drone travels autonomously and a second route section in which the drone travels in the assisted drive mode.

According to another aspect of the invention, there is provided for use with a drone having a first energy source for flying the drone in an autonomous drive mode, and with an assist vehicle (AV) having a second energy source, the AV for holding and transporting the drone in an assisted drive mode, an energy replenishment apparatus comprising an energy inlet port at the drone for porting energy into the drone to replenish the first energy source, and an energy outlet port at the AV for porting energy from the first energy source, wherein the outlet port is engageable with the inlet port to permit transfer of replenishment energy from the second energy source to the first energy source.

The first and second energy sources can be sources of electricity and the engagement can be between an electrical receptacle and an electrical plug. In an alternative, the first and second energy sources can be sources of combustible fuel and the engagement can be between an outlet fuel pipe at the AV and an inlet fuel pipe at the drone. Preferably, a camera is mounted at one of the AV and the drone and sighting indicia are present on the other of the AV and the drone, the camera operable to capture images of the sighting indicia during landing of the drone at the launching and landing platform whereby to precisely place a landing drone to permit an energy replenishment procedure. The indicia can be at a first connector at one of the drone and the camera, with the camera being mounted at the other of the drone and the camera.

The apparatus can further comprise an automated motorized displacement means for moving at least one of the connectors to matingly engage with the other connector. In one form, movement of the at least one connector includes a first movement in a first direction from the initial position to a ready position and a second movement in a second, different, direction from the ready position to the mating engagement position.

The apparatus can further comprise control hardware and software for controlling operation of the recited elements of the apparatus. The control hardware and software can be distributed between the drone, the AV and a control center.

The apparatus can further comprise a metering unit for measuring an amount of energy transferred from the second energy source to the first energy source. The apparatus can further comprise hardware and software for identifying the drone and/or the AV for billing purposes.

According to another aspect of the invention, there is provided drone charging apparatus comprising an electrically powered drone having a pair of projections, and an engaging clamping mechanism, having first and second clamping members physically engageable with respective ones of the projections to electrically connect the first clamping projections to respective ones of the members, the drone having a battery and respective connections between poles of the battery and the drone projections, the engaging mechanism having a DC charging circuit and respective connections between poles of the DC charging circuit and respective ones pf the members, the DC charging circuit energizable to charge the drone through the drone projections. In one form, the projections are metal legs. In one form, that members are metal beams, a pair of which beams are drivably angularly rotatable about a pivot point to move the beams between leg clamped positions and leg unclamped positions.

According to another aspect of the invention, a system comprises a carriage drone operable to fly in autonomous drive mode, an assist vehicle (AV) operable to travel in assisted drive mode in which the AV holds and transports a drone, and system hardware and software for moving the carriage drone over a route in a combination of autonomous drive mode and assisted drive mode held at the AV, the system hardware and software operable to launch the drone, to fly the drone, and to land the drone, the system hardware and software including communication hardware and software, and including route setting hardware and software programmed to receive a drone input identifying a position for the drone, receive an AV input identifying a position for an AV having assisted drive capability suited to transporting the drone, effect autonomous flying of the drone from the drone position to the AV position, effect landing of the drone at the AV position for ongoing travel of the drone on the AV in assisted drive mode.

In one form, the drone position is a start position at which the drone is to be launched, the route setting hardware and software further programmed to effect launching of the drone from the start position. In another form, the drone position is a position at which the drone is flying in autonomous mode. In a further form, the drone position is a position at which the drone is being transported by a second AV, the route setting hardware and software further programmed to effect launching of the drone from the drone position.

In one form, the AV position is the then-current position of the AV, the route setting hardware and software further programmed to effect landing of the drone at the AV at the then-current position of the AV. In another form, the AV position is within a region of interest, points within the region of interest being within a flying range of the drone from the drone position, the route setting hardware and software further programmed to fly the drone to a selected point in the region of interest. In another form, the AV position is in a direction of interest, the route setting hardware and software further programmed to fly the drone to a selected point in the direction of interest. In yet another form, the AV position is a predicted position based on a known schedule of the AV. In yet a further form, the AV position is a predicted position based on an analysis of an identified then-current position of the AV and a travel route of the AV preceding the identified then-current position. In another embodiment, the AV position is on an AV that is moving and the route setting hardware and software is further programmed to effect landing of the drone on the moving AV. In a further embodiment, the AV position is on an AV that is halted and the route setting hardware and software is further programmed to effect landing of the drone on the halted AV.

According to another aspect of the invention, there is provided a method of navigating an autonomously flying drone to meet an AV comprising receiving drone position data, receiving AV position data, identifying a route of the AV, selecting a position for a meeting between the drone and the AV, the meeting position being on the AV route, and generating, using the drone position data, the identified AV route, and the meeting position data, a flying course for the drone to meet the AV at the meeting location.

The drone position can be the then-current drone position. The AV route can be a known scheduled route of the AV. The AV route can be a predicted route of the AV based on AV destination data. The AV route can be a predicted route of the AV based on a recent history of movement of the AV.

The method can further comprises periodically reiterating the recited method steps to update the meeting position and the flying course. The AV can be moving when the drone and the AV meet at the meeting location. Alternatively, the AV is halted at the meeting location. The drone current position can be a non-flying position. Alternatively, the drone current position is a drone flying position.

The method can further comprise using the flying course to generate navigation instructions for the drone to fly to the meeting location. The method can further comprise generating an output representing distance from the drone to the meeting location. The method can further comprise generating an output representing a time of arrival of the drone at the meeting place.

According to another aspect of the invention, a drone package has a drone fixed to a package, the package extending downwardly further than any other element of the drone whereby the package acts as a landing gear for the drone package when landing.

Preferably, the package is reinforced, padded, and covered to suit it for a robust landing without damaging the drone elements or package contents. The drone package can have individual rotors connected to respective corner reinforcing element, the rotors being in a symmetrical array, and including a drive unit to the rotor, a battery or other power source, and communications to and from the rotor, including inter-rotor communication to enable coordinated flying and maneuvering of the several rotors. Each rotor and associated package reinforcing element can include a means for clamping the package between upper and lower corners. The corner reinforcing elements can include a linearly compressible element to facilitate such clamping. In addition, a lateral band can be applied to clamp and bias the angle corners towards one another and against the package. The rotors can be deployed with other packages of different area, can be configured with corner reinforcements having different included angle, and can be configured with different lengths to fit respective different depth packages. The packages can include rings or like fitments to engage on platform cones or like fitments to finalize landing positioning. Such cones (or other fitments) can be retractable to allow a drone to be slid onto or off the platform from a neighbouring area used for drone storage.

According to another aspect of the invention, there is provided a rotor for use in carrying a package, the rotor comprising a housing containing a drive unit to the rotor, a battery or other power source, and communications to and from the rotor, including inter-rotor communication to enable coordinated flying and maneuvering of several such rotors when fixed as a balanced array to a package to be carried. The rotor can be connected to or integral with a corner reinforcing element configured to attachment to a corner of a package.

BRIEF DESCRIPTION OF THE DRAWINGS

FIG. 18 is an isometric view of a container corner casting for use in a mounting arrangement according to an embodiment of the invention.

FIG. 19 is an isometric view of a container showing the location of the corner castings of FIG. 18.

FIG. 20 an isometric view of an anchor frame for use in mounting the drone. accommodating bays of FIG. 15 to the rear of a container.

FIG. 21 an isometric view of an interconnected anchor frame and clamping frame for use in mounting the drone accommodating bays of FIG. 15 to the rear of the container.

FIG. 22 shows a rear part of the container of FIG. 15 with an interconnected anchor frame and clamping frame.

DETAILED DESCRIPTION OF THE INVENTION INCLUDING THE PRESENTLY PREFERRED EMBODIMENTS

Figure 1:
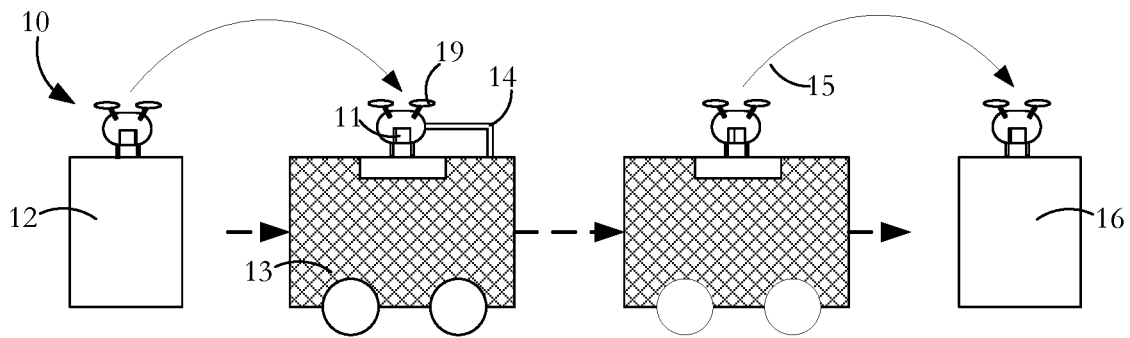
FIG. 1 illustrates a journey by a combination of a drone and a package, part of the route being autonomous flying mode by the drone and part of the journey being assisted mode travel on an assist vehicle (AV).

Referring to FIG. 1, in one form of the invention, a drone 10 bearing a package 11 takes a combination autonomous mode/assisted mode journey. This begins with the drone at a store, depot, or similar start location 12 being loaded with the package 11, the drone 10 launching, the drone 10 autonomously flying to an assist vehicle (AV) 13, the drone landing at the AV 13 where optionally it is recharged/refueled 14, the drone then being transported by the AV 13 in an assisted travel mode over a subsequent part of the route. The initial part of the route from the start location to the AV, and the subsequent part of the route on the AV, are contiguous. At an appropriate location 15 during AV assisted mode travel, the drone 10 launches from the AV 13, and flies autonomously to a location 16 where the package 11 is delivered.

Figure 3:
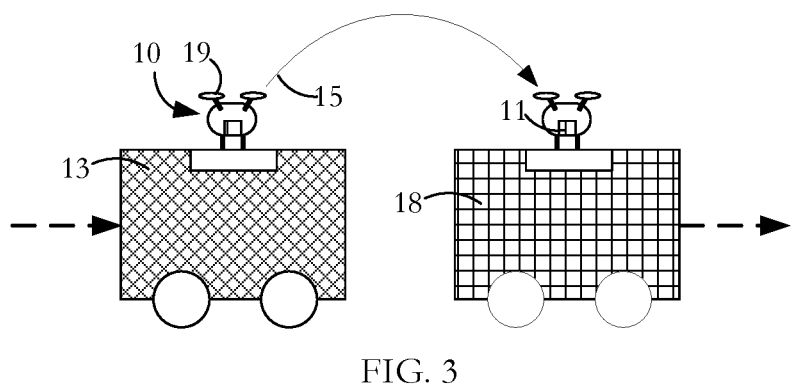
FIG. 3 illustrates a part of a journey similar to the journey of FIG. 1, but showing a route section where there is transfer of the drone plus package from one AV to another AV.

Package pick-up and delivery may be done after the drone 10 lands or when the drone is hovering over a target location (FIG. 3). Thus, in a corded drop or pick-up, a hook 17, articulating gripper or like device is lowered from the hovering drone 10 and raised to the hovering drone 10, with the package 11 being loaded onto the hook 17 (pick-up) or unloaded from the hook 17 (delivery) when the hook is in a down position. In an alternative, delivery is by a parachute drop. In this specification, landing and launching are intended to cover procedures in which a package can be picked up or dropped off by a drone at a start location, end location, or AV location, without the drone necessarily alighting at such a site.

Figure 2:
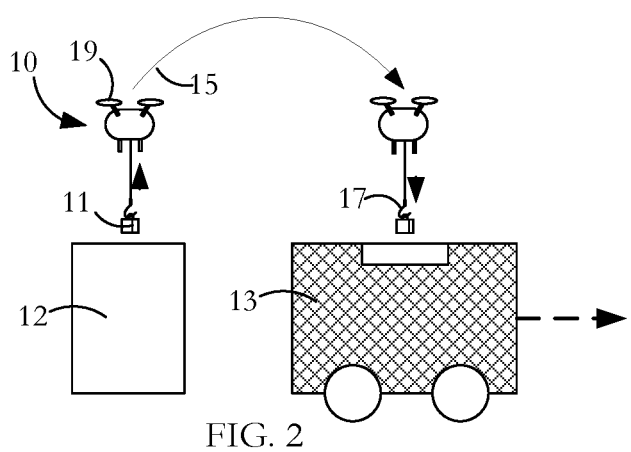
FIG. 2 illustrates a part of a journey similar to the journey of FIG. 1, but showing a route section where package pick-up by, and drop-off from, the drone is by a hook device.

Referring to FIG. 2, a combination autonomous mode/assisted mode journey may include a transfer leg. In a transfer leg, a package-carrying drone 10 enjoying assisted travel on a first AV 13 is instructed to launch from that AV and to autonomously fly to and land at a second AV 18 for onward assisted travel.

In a variation (FIG. 4) of the transfer leg, the package 11, owing to prior travel history, is traveling while secured at one AV 13 without being attached to a drone. The AV 13 is met by a drone 10—either landing or hovering—which, following release of the package 11 at the AV, picks up the package 11 and autonomously flies it to meet another AV 18 (or to a delivery point). The drone 10 lands with the package 11 at the AV 18 for onward assisted travel (or to deliver the package). In a reverse of this variation, the drone and its package are enjoying assisted mode travel on a first AV, the drone launches and flies with the package to a second AV onto which it drops the package, where the package is robotically secured. The package then travels in assisted travel mode on the second AV without, for at least a time, being attached to a drone.

A drone route includes one or more launches from, and landings at, an AV or AVs. For both launching and landing, the AV is designed or adapted to offer launching- and landing-friendly structure and conditions. For landing, typically, drone flight is controlled to halt the drone over a landing site and then to undergo a controlled stall in order to drop and land. Drone landing gear has resilient or other shock absorbing elements to soften the landing and to avoid, to the extent possible, shock damage to the drone or to a carried package.

The main hardware systems of a drone are its flight control system, its rotor to generate lift and thrust, and linking frame parts. The drone body may also house or incorporate a package compartment or package holder, and landing gear. The main elements of the flight control system are, typically, a global positioning system (GPS) by which the drone can identify its position in space, its compass system which determines the drone direction of travel, and its inertial measurement unit (IMU) system, which is used to stabilize the drone's rotational attributes. A drone receives signals at a GPS receiver from GPS satellites and uses the received information to calculate the drone three-dimensional position and current time. GPS data are an important reference used for route selection and navigation (including launching and landing), etc. Sensors at the drone are used to sense any of proximity to objects including AVs and landing/launching platform, orientation, drone energy capacity, local weather elements, etc. Sensor output may be used locally at the drone, for example to effect drone maneuvering, or may be transmitted from an on-board transmitter wirelessly to an AV or control center. The structure and operation of the drone flight control system are incidental to the invention and will not be described in detail.

For the purposes of the present invention, the drone can have any of (a) cameras for obtaining images to assist navigation or for other purposes; (b) sensors (i) for sensing proximity of objects, local weather and atmospheric conditions, and (ii) sensors integrated into subsystems for control purposes; (c) a cargo bay, corded hook, articulating gripper or a similar mechanism for carrying packages.

Control software for communication and for drone maneuvering, including launching, flying, and landing, may be centralized, or distributed. System control hardware and software also includes elements for use in gripping, holding, and releasing a package. Each of the drone gripping, holding, releasing sub-systems may, as appropriate, include motors, such as linear and rotary motors, switches, solenoids, sensors, including contact and pressure sensors, detectors, cameras, drivers and the like. Elements of the system control hardware and software may be located, as appropriate and depending on various factors, at the drone, at an AV or at a control center.

In one form, the drone is controlled remotely from a control center having a wireless network link to a receiver at the drone. Data transmitted over the link for the control of various sub-systems at the drone may include any or all of data and instructions for navigation, maneuvering, engine operation, landing, launching, drone part folding/collapsing (and unfolding/extending), articulating drone parts for holding/releasing packages, drone power source replenishment, etc. As an alternative to central control, elements of control may alternatively, for necessity or convenience, be located out towards the edge of the control network. In some instances, some of the software (including firmware) for each of the operations identified above is located and operated at the drone itself. Similarly, in one form of the invention, an operation to occur at the AV is controlled remotely from the control center (or a different control center) having a wireless network link to a receiver at the AV.

Figure 5:
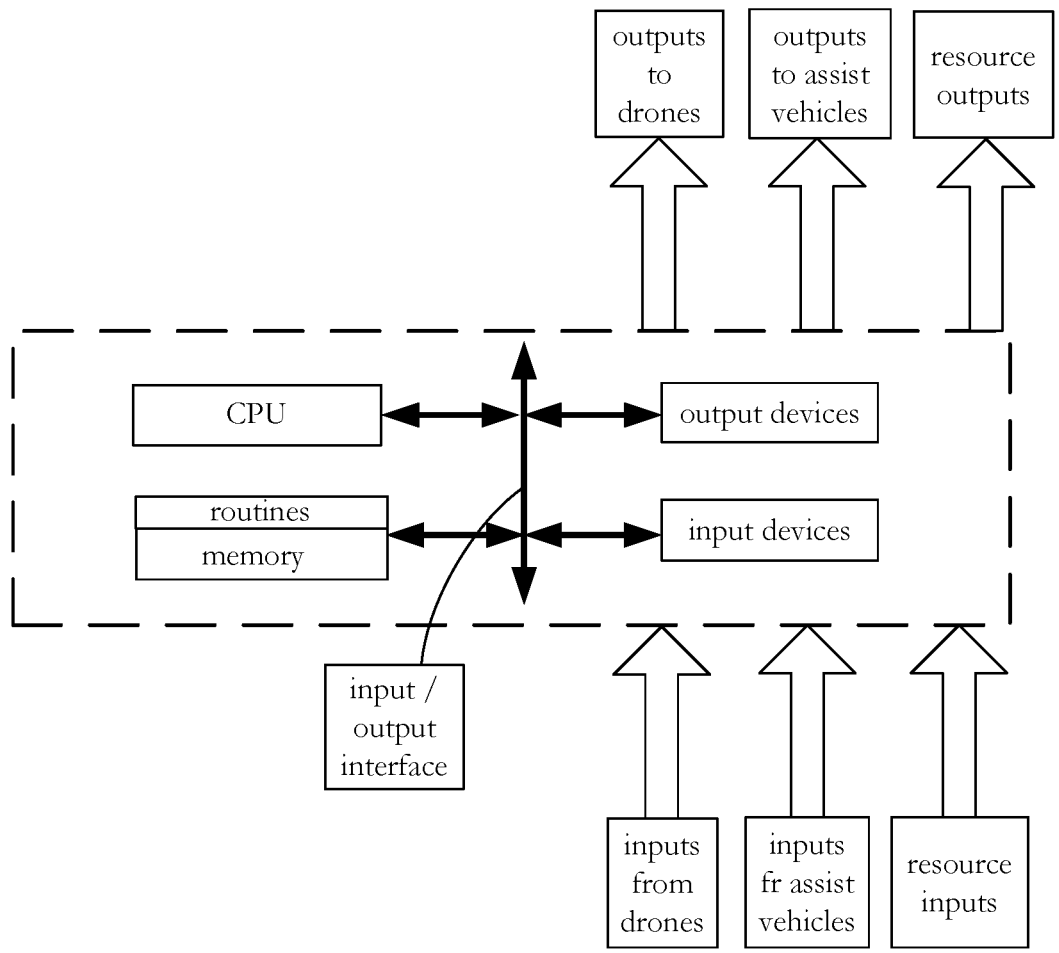
FIG. 5 shows a high-level block diagram of a computing system for implementing an exemplary embodiment of the present invention.

FIG. 5 shows a high-level block diagram of a computing system for implementing an exemplary embodiment of the present invention. The computing system includes system hardware and software for setting a route for a package, being a combination of a package carrying drone autonomous route section and an AV route section, from a start location to an end location. The computing system also includes hardware and software, for initiating the route that is set and for completing the route subject to any route changes that are necessary or advantageous owing, respectively to problems and opportunities that are encountered along the way. Hardware and software are also included for (a) performing package-associated manoeuvres, and (b) enabling communication between elements and sub-systems of the system. The computing system may use known computer processors, memory and storage devices, software (including firmware) and other components. The computing system may include a central processing unit (CPU), memory and an input/output (I/O) interface. The I/O interface receives and transmits various inputs and outputs to and from one or more drones, to and from one or more AVs, to and from one or more control centers, and from resource centers.

Figure 6:
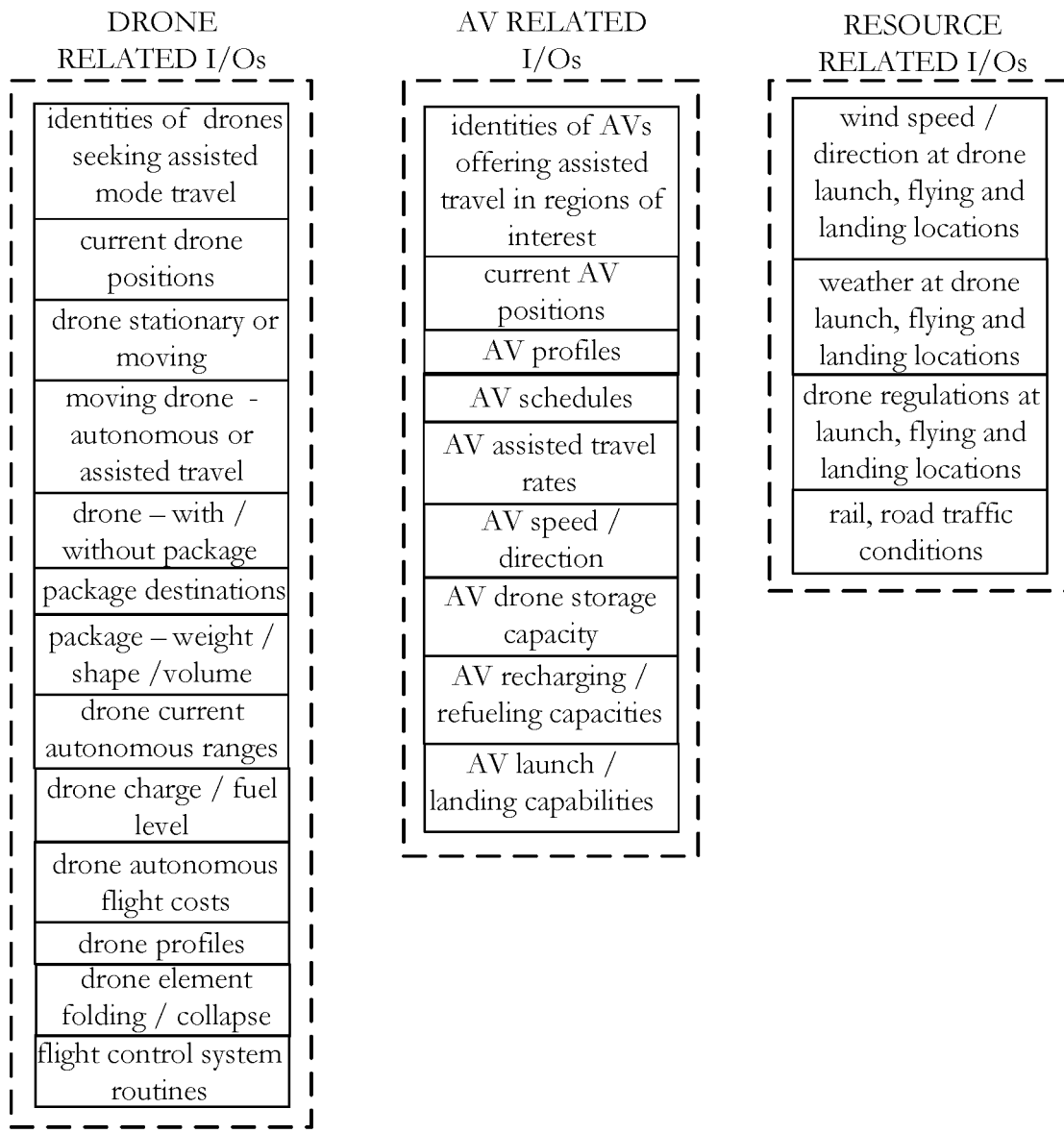
FIG. 6 shows inputs and outputs (I/Os) to a drone, an AV and a control center, selection of from the I/Os being applicable to different embodiments of the invention.

Resource centers include any or all of centers issuing weather conditions, traffic conditions, flying regulations and any other information pertinent to the package and drone traversing the set route. I/Os may also be from and to devices enabling manual user interaction with the computing system. Sample I/Os to and from a drone, an AV and a control center are listed in FIG. 6. Embodiments of the invention may use all or a subset of the I/Os depending on the specific nature of the embodiment. The listed I/Os are not intended to be limiting.

Support circuits may include circuits such as cache, power supplies, clock circuits, and a communications bus. The computing system may include stored routines which are executed by the CPU to process signal from the various possible signal sources. The computer can be a general-purpose computer system that becomes a specific purpose computer system when executing a routine. The computer can communicate with one or more networks such as a local area network (LAN), a general wide area network (WAN), and/or a public network (e.g., the Internet) via a network adapter. The computer may contain additional components as well, beyond those shown in the high-level example illustrated at FIG. 5. The computing system may also include an operating system and micro-instruction code. The various processes and functions described may either be part of the micro-instruction code or part of the application program, or a combination of the two, which is executed via the operating system. Various other peripheral devices may be connected to the computing system. Examples of well-known computing systems, environments, and/or configurations that may be suitable for use with the computing system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Flight control technologies in conjunction with advanced connectivity systems may be used to transmit telemetry and flight control data from cell towers.

Figure 7:
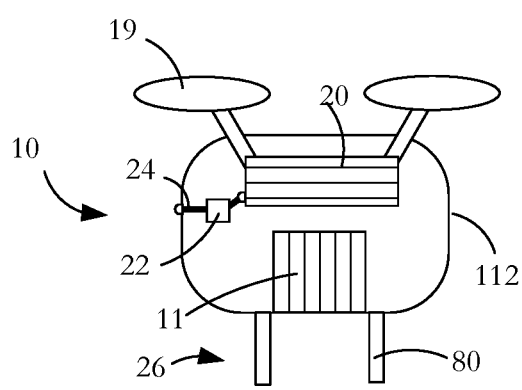
FIG. 7 is a representation of an electrically powered drone carrying a package.
Figure 8:
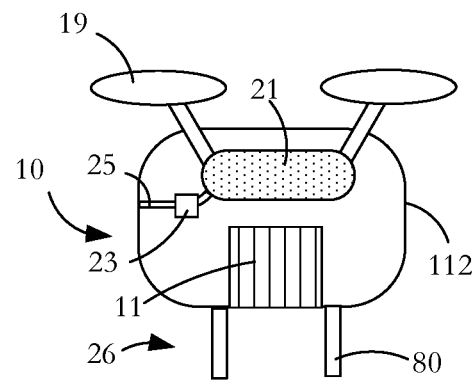
FIG. 8 is a representation of a combustible fuel powered drone carrying a package.

FIGS. 7 and 8 show exemplary drones 10, each having four rotors 19 (of which two are visible), respective drive units 20, 21, respective power sources 22, 23 replenishment units 24, 25, and landing gear 26. Each drone carries a package 11. The drone of FIG. 6 has an electrical drive unit 20 and the power source 22 is a battery. The drone of FIG. 7 has a combustible fuel source 23 and a corresponding combustible fuel drive unit 21. Any suitable fuel and associated fuel replenishment method is contemplated for a drone to be used in the invention, including battery, gas, gas-electric, hydrogen fuel cell, solar, and hybrids using multiple energy sources.

Figure 9:
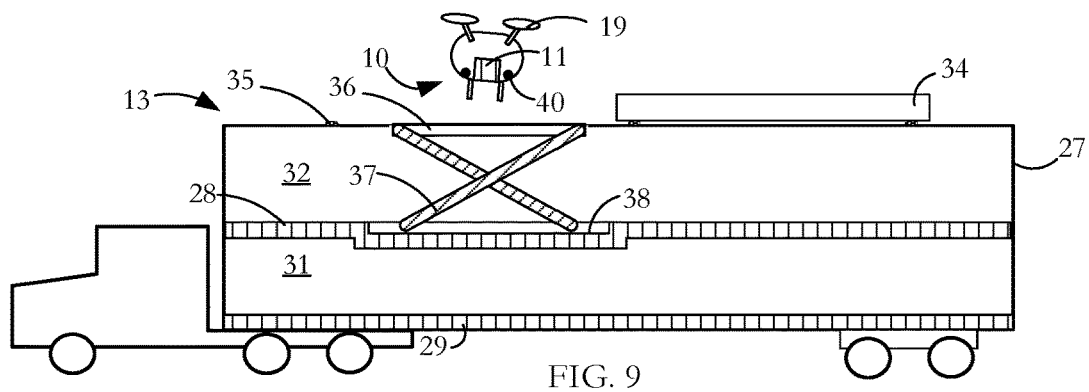
FIG. 9 is a side, part-sectional view of a tractor unit trailing a container, the container receiving a landing drone for assisted mode drive.

The AV can be any vehicle designed or adapted to transport a drone in assisted drive mode, meaning that a drone can be launched from, and landed at, the AV. An AV may be one designed for transport on land, such as road or rail, by water or by air. The invention finds particular application in vehicles as shown in FIG. 9 that transport a standardized ISO intermodal container 27 where the design or adaptation to transport the drone in assisted mode is at the container itself. FIG. 8 shows a side, part-sectional view of such a container 27 coupled to a trailer of a tractor-trailer combination. The container 27 has an interior floor 28 located between the container main floor 29 and the container roof 30. Floor 28 divides the container interior volume into a lower chamber 31 for conventional container storage and an upper chamber 32 for transporting and re-charging drones. Floor 28 extends over the whole area of the container 27 but, in another form, may extend over just part of the area: for example, between parts of the container outer walls and an internal cross-wall (not shown).

Figure 10:
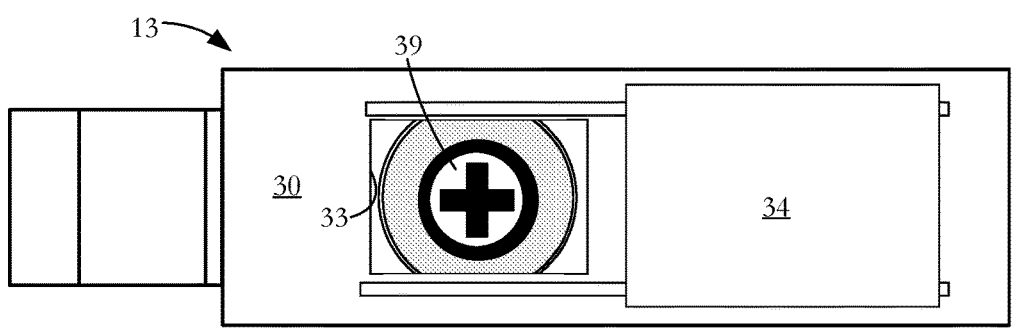
FIG. 10 is a top view of the tractor unit trailing container of FIG. 9.

As shown at FIG. 10, the container roof 30 has an aperture 33 that, in one implementation, extends over a little less than half the length of the container and extends across the container width except for margin regions 34. In other arrangements, such an aperture can be formed in a side, front or back panel of the container. The aperture 33 is rectangular but can be of any suitable shape, such as circular. The aperture can have an alternative configuration and/or size depending, for example, on the size and configuration of drones that are intended to pass though the aperture and depending, also, on expected difficulty in landing and launching.

Figure 11:
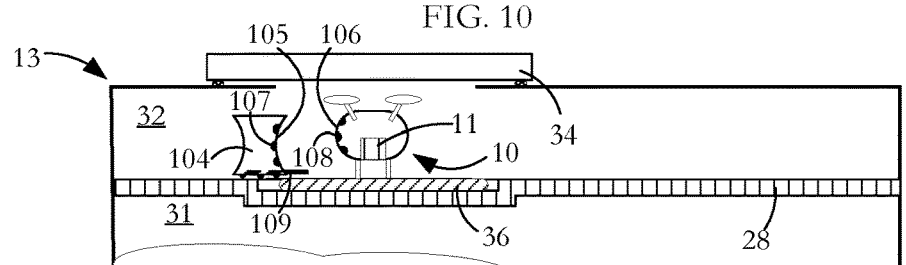
FIG. 11 is a side, part-sectional view of a top part of the container of FIG. 9 showing a landed drone parked within an upper chamber of the container.

As shown at FIGS. 10 and 11, a sliding door 34 has a weatherproof seal 35 at its mounting to the container roof 30 to protect the interior of the upper chamber 32 from adverse weather elements when the sliding door 34 is closed. The door 34 is normally closed (FIG. 11) to protect the interior, but is opened (FIG. 10) to allow a drone 10 to land or launch. In one embodiment, door operation is under wireless control from an approaching drone 10 seeking to land or from a stored drone ready for launch. In an alternative arrangement, the door is hinged. In another alternative, the door is mounted under the level of the roof and slides inside the upper chamber 32.

Referring to FIG. 9, a platform 36 is mounted on a scissor-type extension arrangement 37 which can be retracted from the elevated position of FIG. 8 to a fully lowered position shown in FIG. 10. In the fully lowered position, the elements of the extension arrangement 37 and the platform 36 are supported within a housing 38 so that when the extension arrangement 37 is in its lowest position, the platform top surface is co-planar with the top surface of floor 28. In this way, drones can be slid easily onto and off the platform 36 and along floor 28. Among alternative platform elevators, particularly for a road vehicle with an on-board hydraulics system, the platform elevator uses a hydraulic jack.

Although, as shown in FIG. 9, the platform 36 can be elevated to the container roof 30, the elevator can alternatively raise the platform 36 above the level of the container roof 30 to reduce the incidence of potential obstructions to drone launching and landing. In another form, where, for example, the AV is halted and there is great confidence in the precision of the drone's launching and landing procedures, the elevator rises only to a low height or the elevator is eliminated altogether. In the latter, the platform 36 is fixed at the level of floor 28, and drone launching and landing are executed in a hover mode with the drone rising or descending through the aperture 33.

As shown in the top view of FIG. 10, the platform 36 bears a sighting pattern 39 for use in conjunction with cameras 40 at the drone 10 to facilitate precise landing of the drone onto a desired landing spot. The sighting and use of the pattern by the cameras 40 during landing uses a control procedure linked to dynamic image processing software. In an alternative, the sighting pattern is on the drone and the cameras are on the platform.

Figure 12:
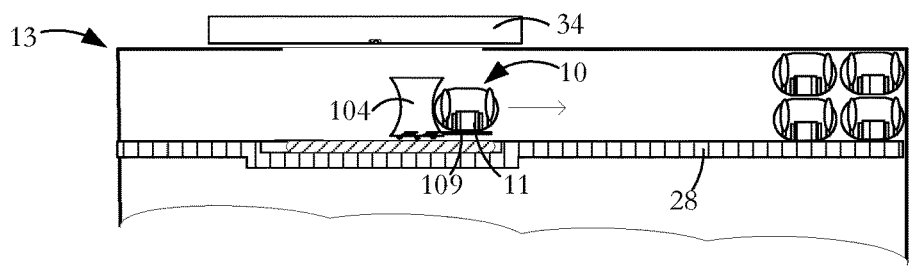
FIG. 12 is a view similar to FIG. 11, but showing several drones within the chamber stacked for storage.
Figure 13:
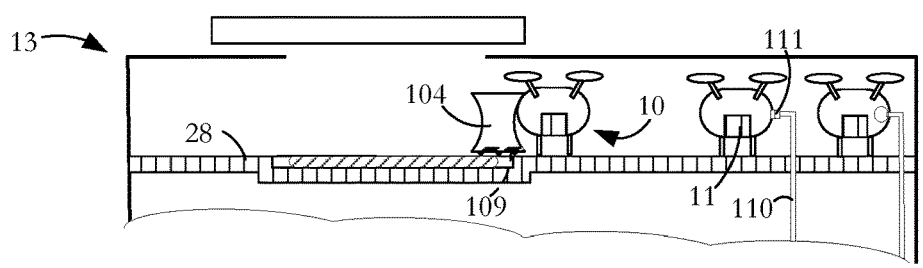
FIG. 13 is a view similar to FIG. 11, but showing drones within the chamber arranged for recharging or refueling.

Referring to FIGS. 11 to 13 showing a top part of the container 27, there is shown a holding mechanism 104 for engaging with a drone 10 that has landed on platform 36. In this specification, a 'holding mechanism' means a mechanism for grasping or attaching itself temporarily to the drone and for pushing or pulling the drone along the floor to a desired position in another part of the upper chamber. In the embodiment illustrated, the holding mechanism is a Dalek™ type robot 104 which engages the drone 10 at a part 105 that is complementary in shape to a part 106 of the drone and which has attachment devices 107, 108, such as magnets, on the robot 104 and on the drone 10. The robot 104 operates to attach itself to a landed drone 10 and to maneuver the drone to a storage site (FIG. 12) or a re-charging/refueling site (FIG. 13). At the storage site, the robot 104 is operable to further maneuver the drone into a laterally stacked position or, using an extending and elevating mechanism 109, into a vertically stacked position. The holding mechanism 104 also operates in reverse to extract a drone 10 from a stacked or refueling configuration and to move the extracted drone across the floor 28 to a launch-ready position on the platform 36. In another alternative, the holding mechanism acts to encircle the drone and to pull it across the floor from one position to another.

One position to which a drone 10 can be moved by the robot 104 is an energy replenishment position as shown in FIG. 13. In one example, energy from an energy source on the AV electrically re-charges a drone through a charge supply line 110 and mating electrical connectors 111—a charger-side connector at the AV and a drone-side connector at the drone. In one form, automated connection can use an adaptation of the charging system and method described in U.S. Pat. No. 11,370,317 (Babu et al.), the disclosure of which is hereby incorporated herein by reference for all purposes. Using an automatic charging device, a method for charging a drone includes a camera at the AV capturing images of indicia on a parked drone or on a drone-side connector. The images are analyzed and based on the image position and orientation, the charger-side connector is moved (for example, movement in an x, y plane) from an initial position to a connection-ready x, y position. The charger-side connector is then driven along the z-axis to cause elements of the electrical connectors to matingly engage. In an alternative, the reference indicia are on the AV or the charger-side connector, and the drone is moved to ready the connectors for engagement.

Figure 14:
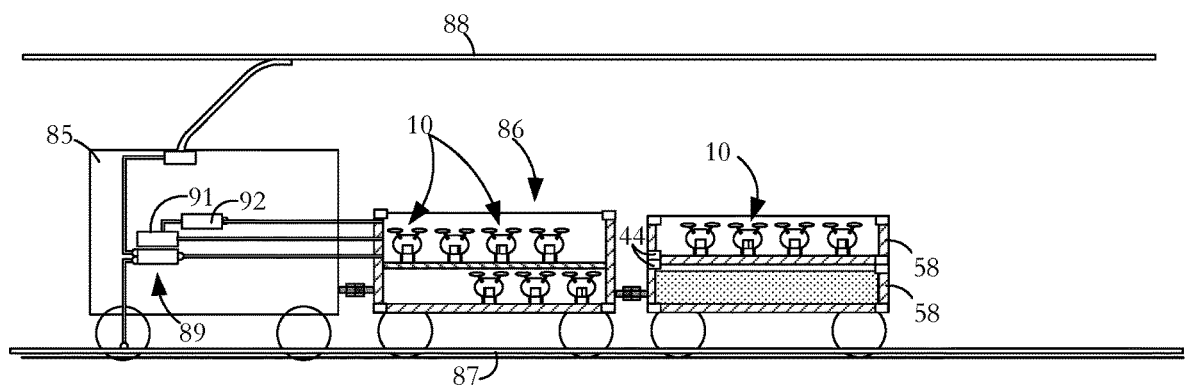
FIG. 14 shows a side view construct of a railway locomotive and wagons pulled thereby illustrating different embodiments of the invention.

FIG. 14 is a composite representation of a train showing various drone drive units/fuel sources have corresponding connection schemes. For example, for a drone powered by a combustible fuel, the drone has an inlet port 41 and a transfer pipe 42 for conveying fuel from the inlet port 42 to a storage tank 43 for an internal combustion drive. At the AV, fuel is pumped from a fuel source through another pipe to an outlet port. For fuel replenishment with the drone parked at the AV, a guidance and connection arrangement is used which may be similar to the example described for electrical charging.

The replenishment system may include hardware, firmware, software for initiating, controlling, and ending each of the process steps previously described. Firmware and software elements may be distributed between the drone, the AV and some other control location with appropriate linking communications hardware and software.

As shown in FIGS. 7 and 8, a package carrying drone 10 has multiple drive rotors 19 and landing gear legs 80, both of which project some distance up and down respectively from the main drone body 112 in order to permit effective flying, launching, and landing. Projecting rotors and landing gear are unnecessary and space-consuming when the drone is being transported by an AV in assisted drive mode. Referring to FIG. 12, the several drones, as well as being stored in a compact arrangement, are themselves 'compacted'.

Referring to FIGS. 15 to 19, in another form of the invention, a drone holder 45 is mounted at corner castings 44 at the back of an ISO intermodal container 27. The corner castings 44 are three-holed blocks of heavy-duty, weathering steel (FIG. 18) which form structural anchors at the corners of the container 27 (FIG. 19). The corner castings 44 are normally used for lifting containers and for connecting them to each other and to trailers of tractor trailers and goods wagons. The holder 45 (FIG. 15) has eight drone bays 46, four commonly mounted on the left rear side of the container 27 and four commonly mounted on the right rear side. Each four-bay structure has a clamping frame 48 (FIG. 20) which connects to an anchor frame 47 as shown in FIG. 21. The anchor frame 47 has the interior of an angle beam 49 adapted to be welded or bolted to vertically aligned corners of the four bays 46. Welded to the exterior of the angle beam 49 at each end are sleeves 50 for slidably receiving cylindrical rods 51 of the clamping frame 48. The clamping frame is telescopic, having two parts 54, each formed by a rod 51 having a casting 52 welded to one end. The casting 52 has locking fingers 53 for insertion into respective side holes of a container corner casting 44. One clamping frame rod has a distal end section formed with a righthand thread and the other rod has its distal end section formed with a lefthand thread.

In use, to mount a four-bay drone holder 45 to a container 27, an anchor frame 47 is attached to a clamping frame 48 by sliding the rods 51 of upper and lower clamping frame parts 54 respectively into the upper and lower sleeves 50 of an anchor frame 47 previously attached to the bays 46. The ends of the two aligned rods 51 are then loosely attached together with an elongate hex nut 55 having a lefthand thread on one end and a righthand thread on the other. The fingers 53 of the upper clamping frame part 54 are hooked onto the container top corner casting 44 and the fingers 53 of the lower clamping frame part 54, in inverted position, are hooked onto the corresponding bottom corner casting. The hex nut 55 is turned one way to draw the two clamping frame parts 54 tightly against the corner castings 44 and so tightly fix the drone bays 46 at one rear side of the container 27. The same procedure is followed to mount bays 46 on the other rear side. At each side, a rotary motor 56 is operated to angularly turn an actuating arm 57 connected to the anchor frame 47 to hinge the corresponding bank of drone bays 46 between different positions.

Figure 15:
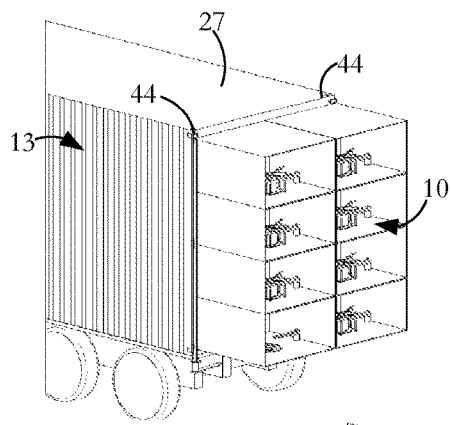
FIG. 15 is an isometric view of an arrangement for mounting drone accommodating bays at the back of a container forming part of an AV, the AV being in assisted travel mode.
Figure 16:
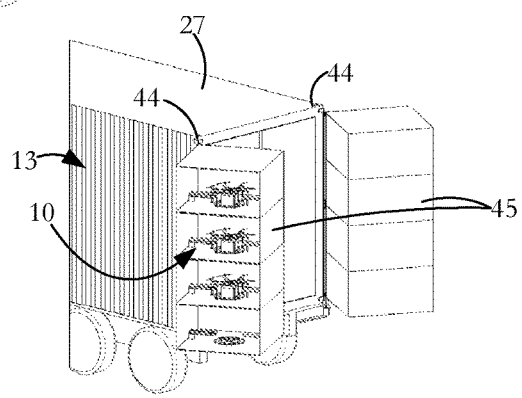
FIG. 16 is a view similar to FIG. 15, but showing the drone mounting arrangement being manipulated to allow access to the container rear doors.
Figure 17:
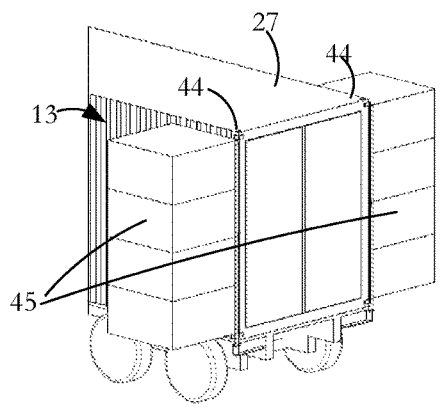
FIG. 17 is a view similar to FIG. 15, but showing the drone mounting arrangement allowing full access to the container rear doors.
Figure 23:
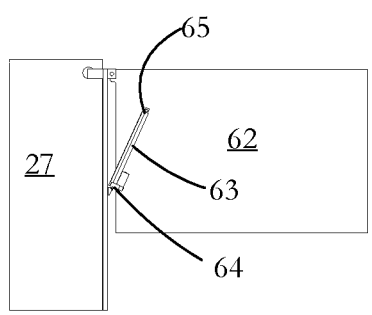
FIG. 23 is an isometric view of another arrangement for mounting drone accommodating bays at the back of a container forming part of an AV, the AV being in assisted travel mode.

When the AV 13 is being driven on the highway as shown at FIG. 13, the four-bay drone holders 45 are locked in the 'closed' position (FIG. 15). When the container 27 is stopped and access to the container rear doors is required, the holder is hinged (FIG. 16) from the closed position and locked in the 'open' position (FIG. 17). The hex nut 55 is turned the opposite way to loosen the clamping frame 48 from its corresponding corner castings 44 if the drone holder bays 46 are to be removed completely from the AV 13.

Other forms of bay and arrangements of multiple bays are possible. For example, as shown at FIG. 19, among various ISO standardized containers are so-called half height containers which are 1.45 meters high and are used usually for dense cargo such as sand. A half height container 58 is configured as a dedicated multi-drone transport module which is lowered onto and connected at its corner castings 44 to a second half-height container 58.

FIGS. 23 to 30 show an alternative arrangement for mounting a bank of drone bays 46 at the rear of an intermodal container 27 forming part of an AV. In this case, there are two banks of bays positioned either side of, and integral with, a drone landing and launching station 61. The station 61 and bays 46, as a unit 62, can be hinged between a lowered position (FIG. 23) in which the unit 62 is in front of the container rear doors, and a raised position (FIG. 24) in which the unit 62 clears the rear doors to allow their opening. The unit 62 is mounted to each side of the container 27 by a powered strut fitment 63 extending between an anchor part 64 integral with the container rear corner and a mounting 65 on the unit 62. The powered strut 63 includes a rotatable sleeve, an interior rod, an electric rotary motor and a compression spring (not shown). To hinge the unit 62 from its lower to its upper position, the rotary motor is activated and its motion is converted to linear movement of the rod within the sleeve against counterweight bias of the compression spring. This acts to push the unit 62 upwards and angularly about container hinge mounting 113 to the upper position where the powered strut 63 locks. Reverse motion is similar following unlocking.

There are as many platforms 36 as there are bays 46 and each platform 36 has an associated holding mechanisms 66 (FIG. 26) for use both in holding a landed drone and recharging it. While structure and operation to hold, and a structure and operation to recharge, a drone could be separately configured in a different embodiment, it is more convenient if they are combined. At each side of the drone landing position on a platform 36 are a respective pair of metal bars 67, the bars pivotable at a mounting block 68 which houses a rotary motor (not shown) to drive the bars 67 between an open position (FIG. 26) and a closed position (FIG. 27). Drone landing is controlled such that opposed drone legs 89 stand on the bisectors of the included angle between respective bar pairs. The platform 36 has charging posts 61 electrically connecting a charging system (not shown) forming part of the AV 13 to the bars 67.

For drone maneuvers, such as landing, launching, and storing, performed at the central station 61, the associated platform 36 is retained at a central location in the distribution tray 60 (FIG. 28) by engagement of the platform 36 within channels 114 and within a sliding mechanism 69 mounted on the tray 60. The sliding mechanism 69 has linear motors 70 to slidably drive respective actuating rods 71 along their longitudinal axes through tubular bearings 72. The rods 71 have retractable pins 73 at their free ends which fit into respective slots 59 in the platform 36. One or other of the pins 73 is engaged in its corresponding slot 59 while the other pin is retracted so that the platform 36 can be driven into (or out of) a selected bay 46.

The tray 60 has bushings 74 integral with tray flanges 75 allowing the tray 60 to be slid up or down on linear shafts 76 (FIG. 29) integral with a rear wall 77 of the unit 62. To drive a platform 36 to the level of a particular bay 46, an acme nut 78 integral with tray flange 75 screw engages a centrally located acme rod 79 integral with the unit rear wall. The acme rod 79 is rotated about its axis to drive the platform 36 up or down.

Figure 24:
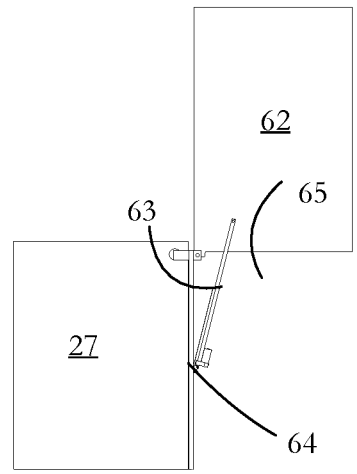
FIG. 24 is a view similar to FIG. 23, but showing drone accommodating bays at the back of a container for an AV, the AV shown in a condition allowing container door opening and closing.
Figure 26:
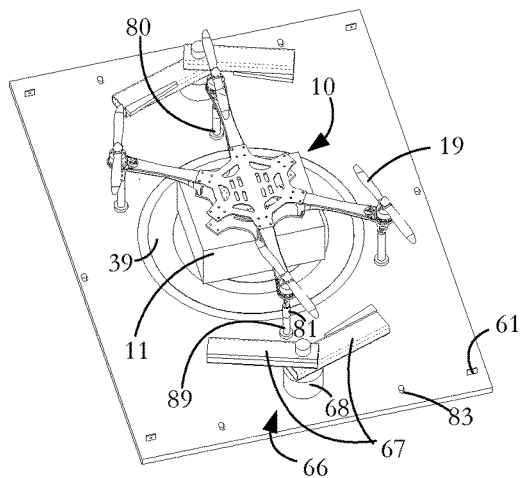
FIG. 26 is a perspective view of a landed drone on a platform showing elements of a drone holding and charging arrangement, such elements shown in an undeployed state.
Figure 27:
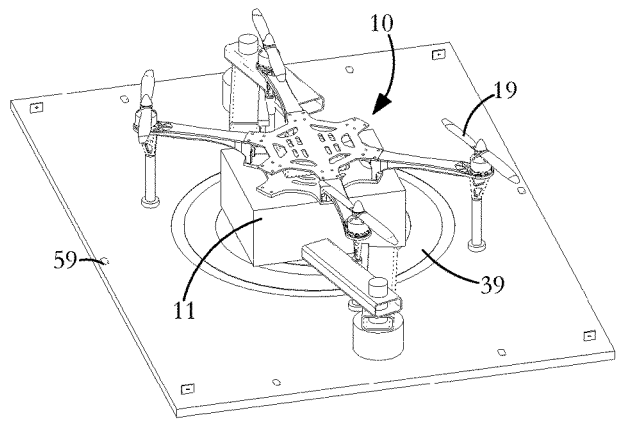
FIG. 27 is a view similar to FIG. 26, but showing the drone holding and charging elements in a deployed state.
Figure 28:
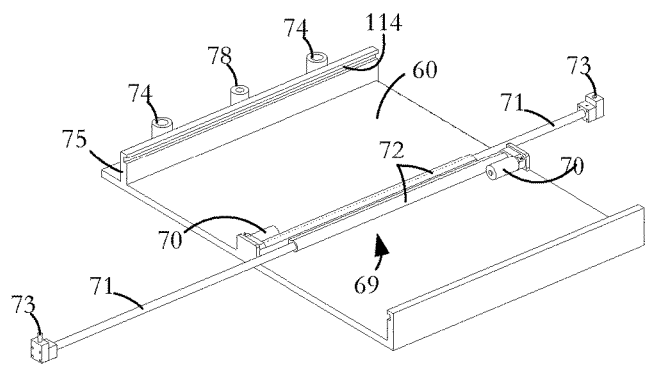
FIG. 28 is an isometric view of a distribution tray and sliding mechanism for use in lateral shifting of the platform of FIG. 26.
Figure 29:
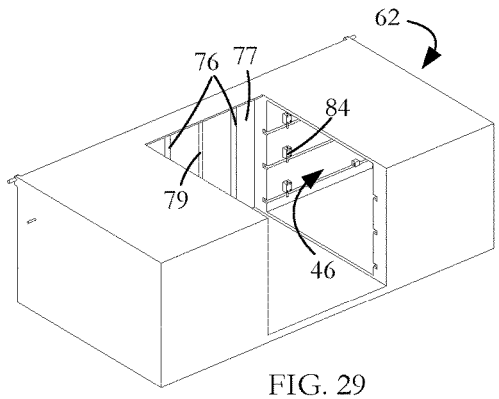
FIG. 29 shows a configuration of bays for the arrangement of FIG. 26.
Figure 30:
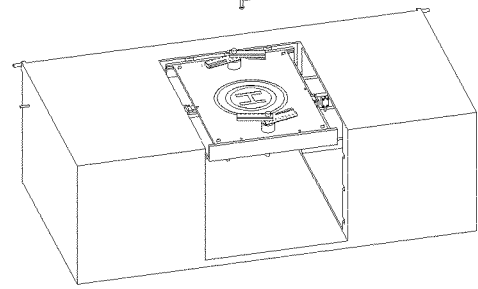
FIG. 30 is a view similar to FIG. 29, but showing a particular configuration where a drone is preparing to land.

In use, an empty platform 36 is extracted from one of the bays 46 and is elevated to the top of the station 61 to await the arrival of a flying drone (FIG. 30), with the bars 67 being in the 'home' position (FIG. 26). The drone 10 shown is a package-carrying, electrically powered drone having six rotors and a six-legged landing gear. The landing procedure is implemented to land the drone 10 accurately in relation to the bar angle bisectors. When completion of landing is sensed, the rotary motors at mounting blocks 68 are energized to angularly rotate the bars 67 to close the included angles and so bring the bars of each pair towards one another to the positions shown in FIG. 27. The closure of a bar pair both clamps the two drone legs 89 to prevent any further movement of the halted drone 10, and causes the bars 67 to make electrical contact with respective charging circuit terminals 81 on the clamped legs 89. Once the drone is held at the platform 36, the elevating mechanism 78, 79 (FIGS. 28, 29) is actuated to bring the tray 60 to the desired bay level. Once at the right level, the sliding mechanism 69 is actuated to slide the platform 36 and landed drone 10 into channels 82 at the selected bay 46. As the platform 36 reaches its fully inserted position, locking posts 83 on each side of the platform 36 are engaged by an over-center locking mechanism 84 mounted at the bay 46. The engaged pin 73 is then retracted and the applicable slide mechanism rod is withdrawn back into the central station. The platform 36, drone 10 and package 11 are consequently locked at the selected bay 46 in preparation for an assisted drive leg of the journey and ready also for eventual hinging of the bank of drones 46 to the container door opening position (FIG. 24).

In a variation (not shown), particularly for single drone assisted mode accommodation, the AV has an exposed platform; i.e., one not accommodated in a bay or compartment. The platform is attached to a panel or frame member of the AV and can be hinged between a horizontal position for drone launching and landing and a substantially vertical position against the panel for storage for assisted mode travel. In the storage condition, a transported drone is temporarily fixed to the platform shortly after the drone lands while the platform is still in the horizontal condition and before the platform—with drone attached—is stored. When the assisted mode travel leg is complete and the drone is to be re-launched, the platform is robotically hinged from the storage position to the horizontal position, and the drone is released from the platform just before the launch procedure takes place. The launch can be completed from the AV while it is still moving if conditions are conducive to that, or the AV is brought to a halt for the duration of the launching procedure. At the end of launching, the now-empty platform is hinged down to its storage position for onward travel of the vehicle. A locking mechanism is provided for automatically locking and unlocking the platform at deployed and storage positions.

Referring to FIG. 14, there is shown a schematic view of one form of AV—a train locomotive 85—towing a goods wagon 86. The AV is shown having several features which may not normally be seen together on a conventional locomotive, but are shown here on the same locomotive image for convenience of illustration. FIG. 14 illustrates a particular aspect of the invention: recharging or refueling possibilities during assisted mode travel. In one form, the locomotive 85 is electrically powered, with electricity being supplied to the locomotive drive unit through a rigid conducting rail—a so-called third rail 87—mounted either beside the train track or between the main rails of the track. In another form, the locomotive is electrically powered by an overhead line 88. In both cases, in addition to a main feed to the locomotive drive unit, a supplementary circuit and connection arrangement shown schematically as 89 is provided for recharging the batteries of drones 10 enjoying assisted drive in the wagon 86.

In a further form, for a locomotive 85 powered by a combustible fuel such as diesel, the fuel from the locomotive tank having a main feed to its drive unit and a supplementary feed and connection arrangement shown schematically as 91 for refueling internal combustion drones enjoying assisted drive in the wagon 86. In yet another form, for a locomotive 85 powered by a combustible fuel and electrically powered drones 10, fuel is fed through a supplementary line to drive an electrical generator 92 and a supplementary circuit and connection arrangement is provided from the generator 92 for recharging the batteries of following drones 10.

Energy replenishment schemes such as those described can be used with other electric AVs such as trams (including segmented ground-level powered trams), light transit, and other road, air—and sea-borne AVs with appropriate tailoring to adapt the replenishment scheme to the energy sources at the AV and at the drone. Each of the replenishment schemes described may, as appropriate, include cables, pipes, switches, valves, regulators, sensors, drivers and the like, and control hardware and software for their operation.

In terms of speed of transfer between drone flying mode and assisted travel mode, it may be quicker or more convenient if, for landing at and launch from the AV, the transfer is done while the AV is still moving rather than having to bring the AV to a halt to effect either of those procedures; i.e., a dynamic transfer. One description of such a system is found in Visual Servoing Approach for Autonomous UAV Landing on a Moving Vehicle, Keipour et al., which, together with the text of the references cited therein, is hereby incorporated by specific reference in this specification. While dynamic transfers may be implemented in 'first mile' or 'last mile' travel, such procedures may also occur in transferring a drone and its package from one AV to another AV.

Figure 31:
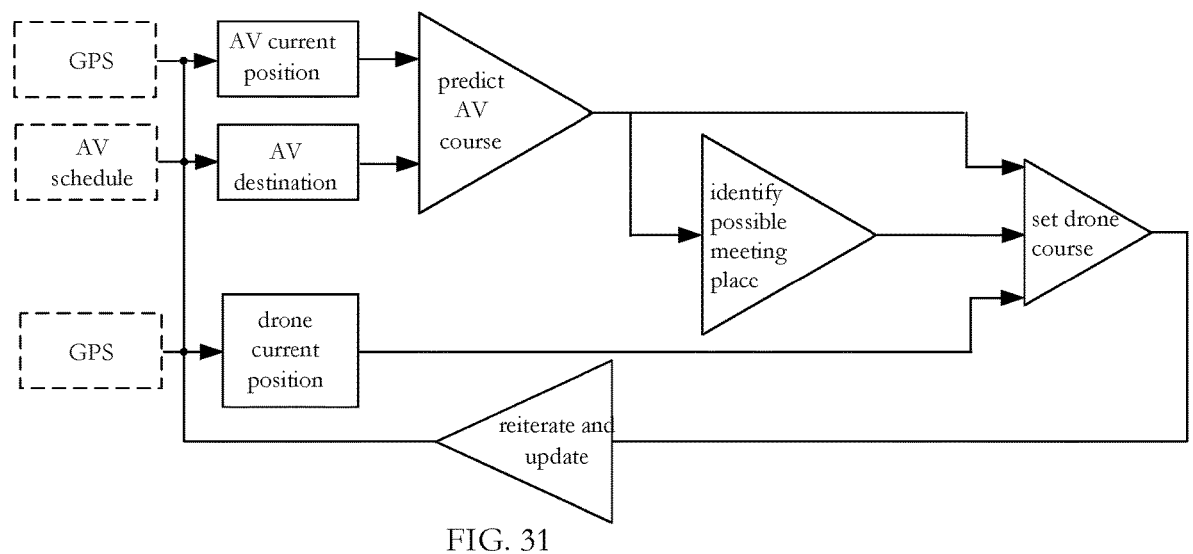
FIG. 31 shows a schematic view of a process for setting a drone course with a view to the drone landing at a moving AV.

FIG. 31 shows an exemplary sequence for setting and updating a drone course with a view to landing at an AV which is moving at the time of landing. The location of the drone and the AV are registered at certain times. An AV course from its current position is predicted using GPS positions possibly supplemented by a known prearranged overall AV route. A possible drone-AV 'meeting place' is identified and an initial course is set for the drone. Input data is periodically updated and reentered and the course and meeting place are reset.

Landing and launching a drone at an AV are difficult for many reasons and so, in most cases, it may be necessary or convenient to temporarily halt the AV before such a maneuver is implemented. In one form, an AV halt is pre-scheduled with knowledge of the halt time and location known to the drone and that AV. In another form, communication is established between the AV and the drone (or a control center) to set up the time and place of a halt or to check whether the AV has already been halted for an incidental purpose: for example, at a highway service center.

For a drone ready to land at an AV, in one form, communication between the drone and the AV or between the drone and a control center is triggered by a proximity detector on the drone. The drone's presence and wish to land is communicated to the AV driver or to an AV drive unit. In response, in one example, the AV is brought to a halt while the drone follows a flight course to land on the AV when it halts. In another example, an instruction is issued to the drone to proceed to a selected meeting spot where the AV is to stop and the drone is to land. This describes a sequence for flying a drone to land at an AV; for example, in the context of a drone with payload launching from a shop or depot and flying to and landing on an AV: a 'first mile' travel.

A reverse sequence is adopted for 'last mile' travel where a drone plus package is traveling in assisted mode on an AV. As the AV enters a region of landing opportunity in which the drone destination (being possibly, also, the final package destination) is located, an instruction is sent to the drone to launch and a corresponding communication is sent to the AV driver (or AV drive unit) from the drone or from a control center. In response, in one form, the AV is brought to a halt at a convenient or logistically preferred position in the region, whereupon the drone launches. In another form, the drone launches from the moving AV after due preparation and at a convenient or logistically preferred position in the region, with notification of the impending launch optionally being sent to the AV driver.

In yet another sequence, using elements of both the last mile and first mile sequences, the drone launches from a first AV when that first AV is halted or is moving within a region of opportunity. Thereupon, the drone flies to a second AV within a corresponding region of opportunity and lands, either after the second AV halts or while it is still moving.

Clearly, a landing spot or launching spot, whether for a dynamic or a halted transfer, must not be so far away from the drone that the drone is unable to fly autonomously to the spot because of its limited range.

Figure 25:
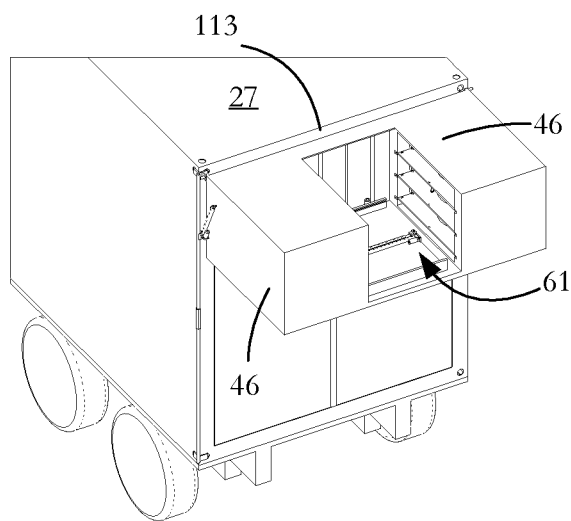
FIG. 25 is an isometric view of the arrangement of FIG. 23.
Figure 37:
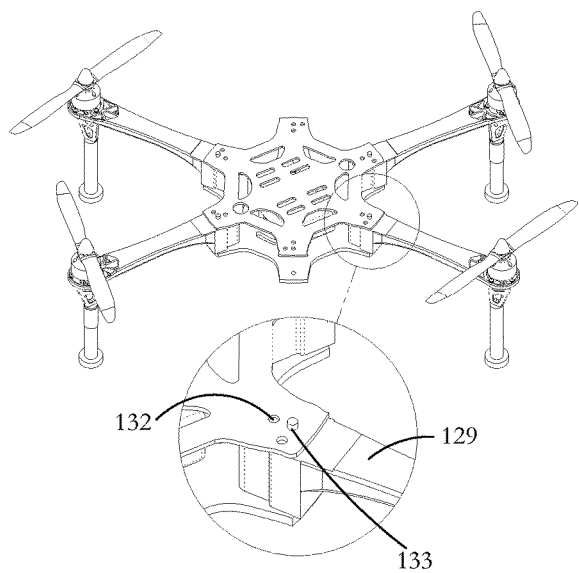
FIG. 37 is a scrap view of part of a drone core used in the embodiment of FIGS. 32 to 36.
Figure 38:
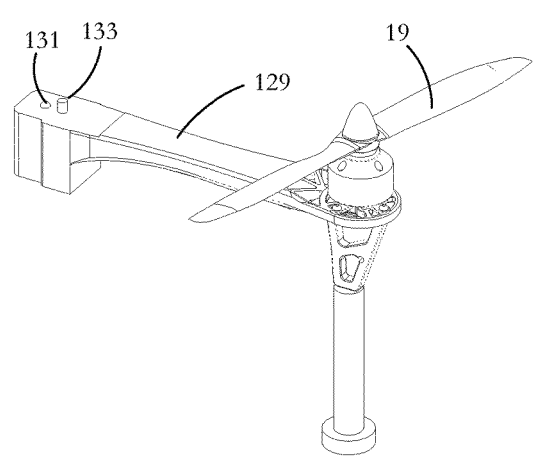
FIG. 38 is a scrap view of part of a rotor supporting arm used in the embodiment of FIGS. 32 to 36.

In one form of the invention, rotors and/or landing gear legs are mounted to the main body of the drone using flexible or articulatable mountings. An articulated version is shown in FIGS. 33 to 38. Hingedly mounted to the top of a unit 121 of the form shown in FIG. 25 is an actuating arm 115. The arm 115 is driven to rotate about axis 116 between a home position (FIG. 33) and a deployed position (FIG. 34, 35) by operation of a rod 117 and cylinder 118 arrangement driven by motor 119. A fixed end of the cylinder 118 is mounted at point 120 on unit 121. The outer end of rod 117 is mounted between flanges 122 extending from arm 115. At the end of the arm 115, disc member 123 is drivably rotatable about its axis by a rotary motor 125. A pair of fingers 126 project from the disc member 123. When the drone 10 is in the landed position of FIG. 35, the drone legs 80 (four of which are shown) are received in channels 127 mounted to the platform 36. Hinging of the actuating arm 115 from the home position to the deployed position is such as to cause the fingers 126 to enter holes 128 (FIG. 35) in the drone central structure. After engagement of the fingers 126, rotary motor 125 is operated to turn the disc member 123. In response, rotor supporting arms 129 where they are mounted to the disc member 123, are forced to move tangentially about the drone central axis. Because movement of the outer ends of the supporting arms 129 and their depending legs 80 is constrained by the channels 127, they cannot tangentially track the movement of the mounting positions. The constraint causes the fingers 126 to move radially inwardly along channels 127 towards the drone central axis, thereby hinging the rotor supporting arms 129 about their mounting positions and towards the core of the drone. To permit this angular hinging, a spring mounted ball 131 in the top of each supporting arm (FIG. 38) and two ball retaining housings 132 in the drone central structure (FIG. 37). As a supporting arm 129 is forced tangentially by the rotary motor 125, the inner end of the supporting arm 129 rotates about shaft 133 and forces the spring ball 131 downwards. The spring ball 131 is forced to unseat from one housing 132—a 'flight' housing—to allow movement of the supporting arm 129 from its landed position to a folded storage position, where the spring ball re-seats in the second housing 132—a 'storage' housing. The rotors 19 and the supporting arms 129 are folded against the drone body when drone storage is required and unfolded prior to launch. In this way, the overall storage volume of a drone is reduced compared with its overall flight volume. Drone expansion is done by similarly engaging the drone 10 with the actuating arm 115 and operating the rotary motor 125 to turn in the opposite direction. The 'compacting' of a drone is useful for dense multiple storage in an AV bay. It is useful also for situations where the drone is attached and transported at the exterior of an AV and where a smaller drone profile will reduce wind resistance encountered during AV assisted mode travel. In another embodiment (not shown), the legs are mounted to permit them to be folded against the drone body to further reduce overall drone volume. In an alternative, elements of the drone may be made of a flexible material to permit similar drone volume reduction by bending and fixing such elements against the drone body. In the embodiment described, volume reduction is done by an AV mechanism acting on elements of the drone; in another form (not shown), volume reduction is done using a mechanism forming part of the drone itself.

Figure 4:
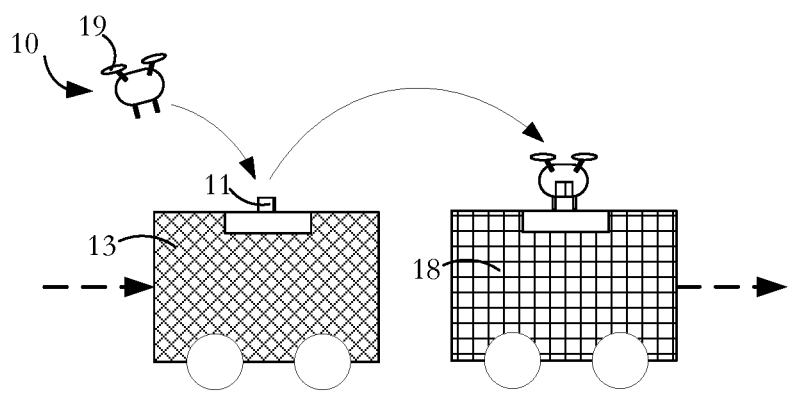
FIG. 4 illustrates a part of a journey similarly to the journey of FIG. 1, but showing a route section where the package travels on an AV without being carried by a drone.
Figure 39:
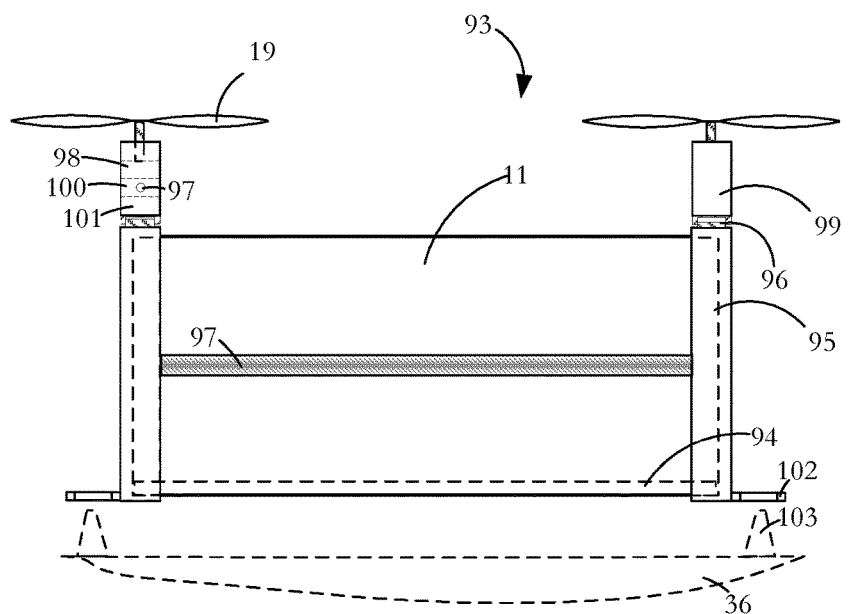
FIG. 39 is a side view of a drone package according to an embodiment of the invention.
Figure 32:
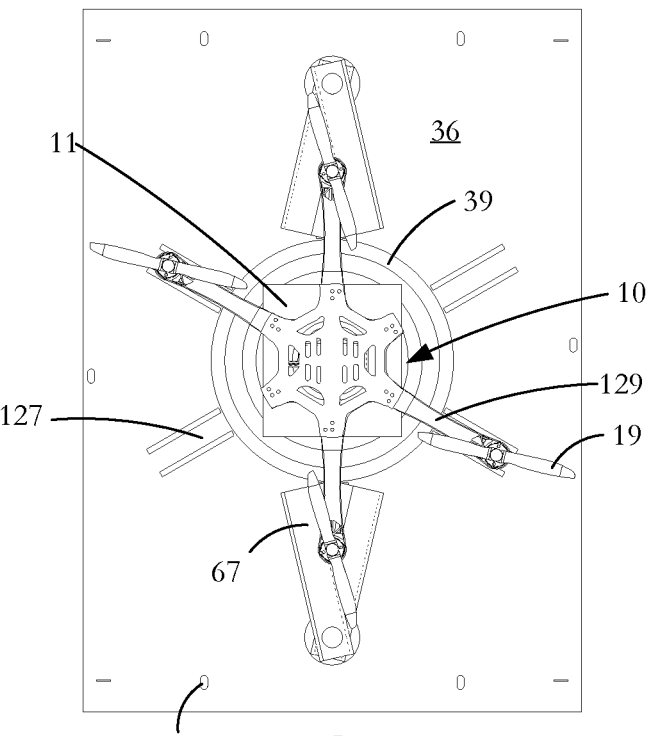
FIG. 32 is a plan view of a drone in a landed configuration on an AV platform together with elements of the platform, according to an embodiment of the invention.
Figure 33:
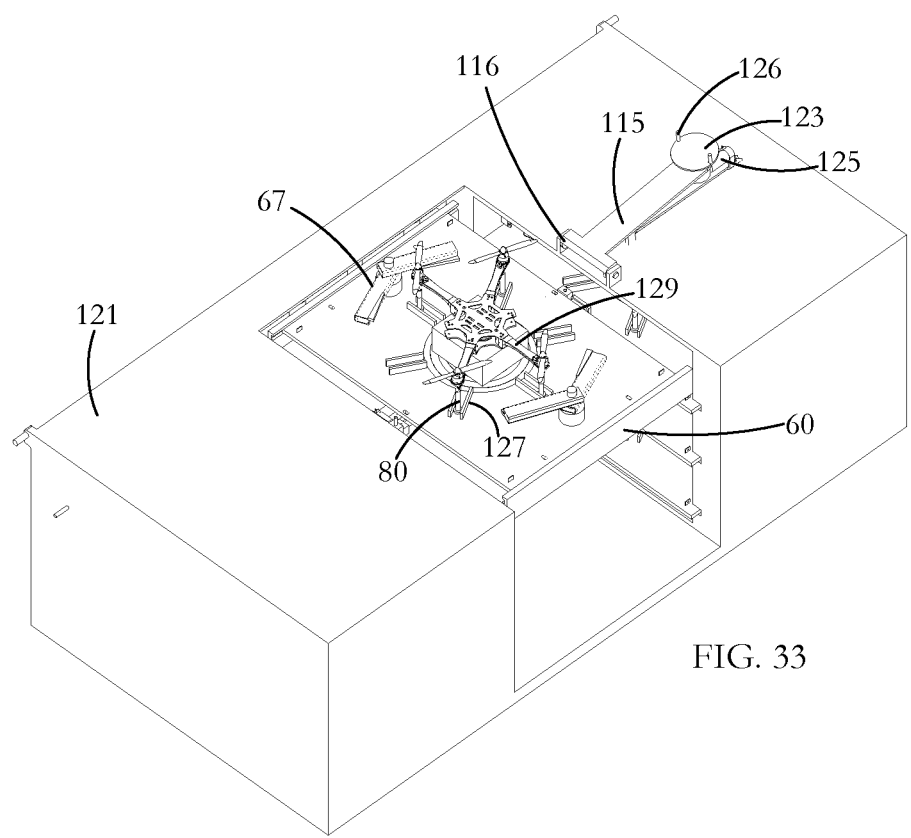
FIG. 33 is an isometric view of the drone of FIG. 32, showing further elements of the AV, including a drone collapsing mechanism shown undeployed, according to an embodiment of the invention.
Figure 34:
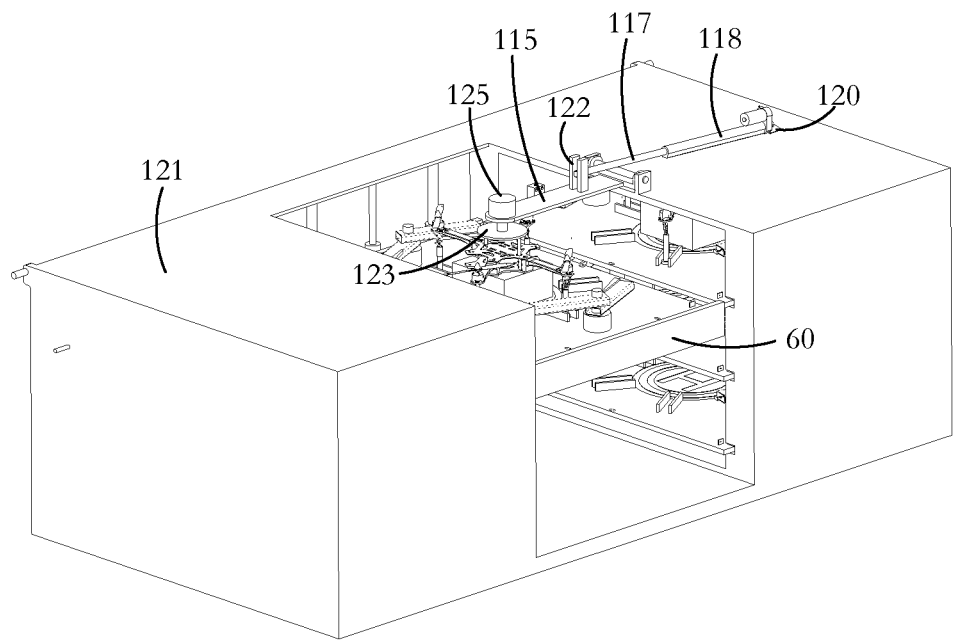
FIG. 34 is a view corresponding to FIG. 33, but showing the showing the drone collapsing mechanism ready for deployment.
Figure 35:
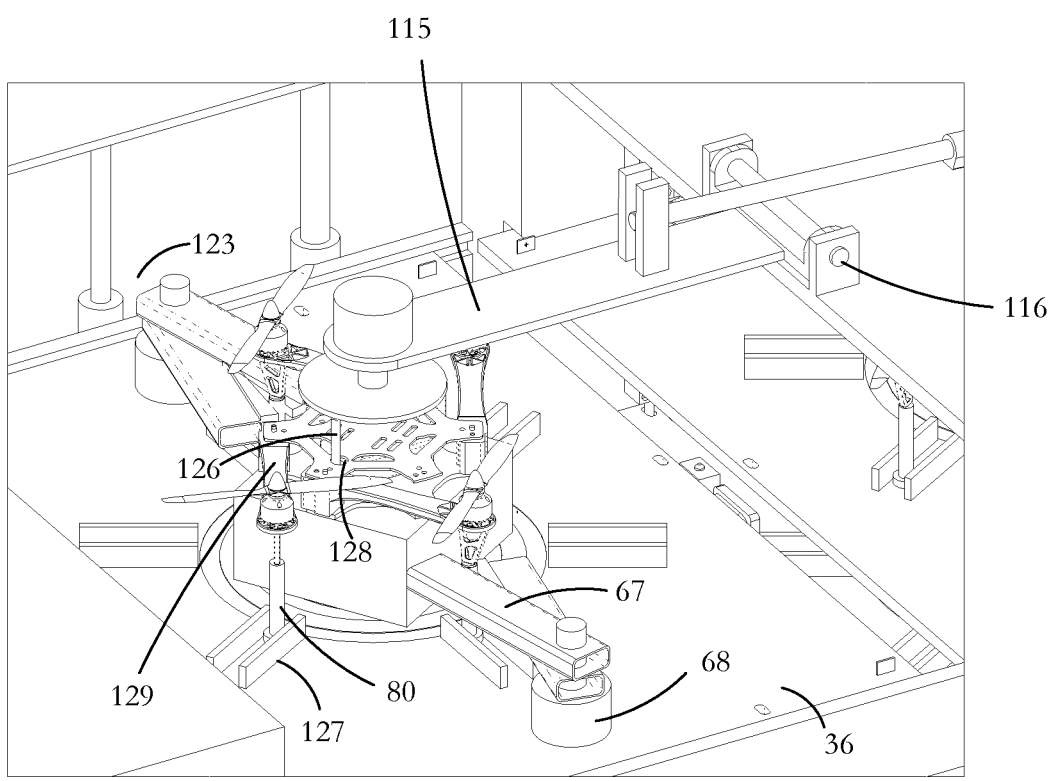
FIG. 35 is a view showing part of the view of FIG. 34, but showing the drone collapsing mechanism deployed and drone legs clamped.
Figure 36:
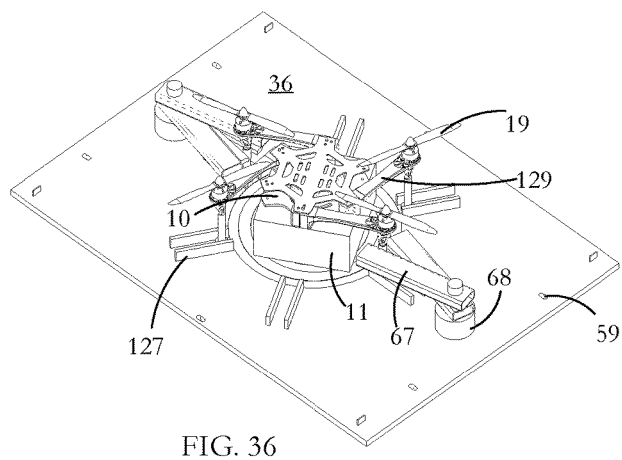
FIG. 36 is view corresponding to FIG. 32 but showing the drone collapsed and clamped.

As mentioned with respect to FIG. 4, a mixed autonomous mode—assisted mode journey can be viewed as a journey of the carried package instead of a journey of the drone. Referring to FIG. 39, there is shown what might be termed a drone package 93. The figure shows one elevation but, in this case, the drone package is a cuboid of square area and all other side elevations are substantially the same. Of note, there are no landing gear legs; the bottom of the package 93 acts as its own landing gear. The package itself projects down below all other elements of the structure and is reinforced, padded, and covered as necessary to ensure a soft landing with low damage risk to the drone or package contents. The drone package 93 accommodates a lightweight, corrugated, resiliently deformable mat 94 to cushion landing and has reinforcing, lightweight plastic angle structures 95 at each vertical corner. Above each angle corner 95 is a rotor 99 which is connected by a lightweight acme rod and nut combination 96 to the angle corner 95. A drive unit at the rotor 99 houses a battery 100 (or fuel tank) including a replenishment port 97, a drive train 98 and communications and control hardware and software 101. Because the rotors 99 are independently mounted, additional communication is required between them to assist in coordinating flying and maneuvering of the drone package. The acme combination 96 has a pitch direction such that when the associated rotor 99 is spinning, inertial forces transmitted to the body of the rotor tend to resist any tendency for the acme combination to loosen. In another configuration, the angle corner 95 is differently configured to have linear compressibility and its top mounting is differently configured so that the inertial forces tend while the rotor is turning to apply, through the angle corners 95, a vertical clamping force between the package upper and lower reinforced corners. In another configuration, a clamping band 97 is used to pull adjacent angle corners together and against the package vertical corners as a final step in drone package preparation. In a further configuration, a push connector joins a rotor 99 to an angle corner 95.

In assembling a drone package, rotors 99 can be deployed with other packages of different area, can be configured with different included angles for use with triangular, pentagonal, etc., package shapes, and can be configured with any of several lengths to permit use with packages of different height. In one embodiment, the angle corner 95 has an outwardly projecting horizontal ring 102 used to set final placement of the drone 10 as it lands on a platform 36. The ring 102 seats over an upwardly-projecting cone 103, one of an array of such cones formed on the platform 36 as shown in phantom in FIG. 29. In a further embodiment, when required, the cones are reciprocally vertically driven downwards against a spring bias to exit their surrounding drone rings, thereby to clear the platform and allow the drone to be subsequently slid off the platform and moved to a storage or energy replenishment site.

While control hardware and software, including communication hardware and software, can be distributed between the drone and the AV, in another implementation, some of the processing and control is assigned to a control center. At the control center, which may itself be distributed— for example, between different cities—there may be the capability for intervention of a human operator. Such an individual may provide any of general oversight, troubleshooting logistical issues, and taking over in the event of an emergency or catastrophic failure somewhere in the system.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. A system comprising
   a drone having autonomous flight capability,
   a package loaded on the drone,
   a start location,
   a customer location,
   an assist vehicle (AV), and
   control hardware and software configured to control flying of the drone with the loaded package over a first section of a route from the start location to the AV, to control carriage of the drone with the loaded package on the AV in an assisted drive mode over a second section of the route contiguous with the first section of the route; and to control flying of the drone with the loaded package over a third section of the route from the AV to the customer location, the third section of the route is contiguous with the second section of the route.

2. The system of claim 1, wherein the AV is any of a rail, road, waterborne and airborne vehicle.

3. The system of claim 1, wherein a part of the AV is an ISO intermodal container.

4. The system of claim 1, wherein the AV has a drone energy replenishment capability having an energy outlet connectible to an energy inlet at the drone, when the drone with the loaded package is at the AV.

5. The system of claim 1, wherein the AV is powered by electricity from one of an overhead line, a third rail, and a battery with the AV having a circuit to take a part of the electricity to charge the drone when the drone with the loaded package is at the AV.

6. The system of claim 1, wherein the AV is powered by an energy source other than electricity, the system further including a generator for converting a part of energy from the energy source to electricity, and a circuit to take a part of the electricity to charge the drone when the drone with the loaded package is at the AV.

7. The system of claim 1, wherein the drone is powered by an energy source other than electricity and the AV has a corresponding energy source and replenishment means for transferring energy from the AV source to the drone source when the drone with the loaded package is at the AV.

8. The system of claim 2, wherein the AV is a trailer or tractor unit of a tractor trailer combination.

9. The system of claim 2, wherein the AV is one of a pick-up truck and an automobile.

10. The system of claim 1, further comprising a holder mounted at the AV, which holder holds the drone with the loaded package.

11. The system of claim 10, wherein the holder is mounted on the exterior of the AV.

12. The system of claim 10, wherein the holder is mounted in a bay in the interior of the AV.

13. The system of claim 1, wherein a drone launching and landing platform is mounted at the AV.

14. The system of claim 13, wherein the drone launching and landing platform is mounted on an elevator for moving the drone launching and landing platform up and down respectively for drone launching and landing.

15. The system of claim 12, wherein the bay accommodates a grasping and moving mechanism operable to grasp the drone and to move the drone with the loaded package between a first position in the bay and a second position in the bay.

16. The system of claim 15, wherein the first position is any one of a landing position, a launching position, a drone storage position, and a drone energy replenishment position and the second position is any one of a landing position, a launching position, a drone storage position, and a drone energy replenishment position.

17. The system of claim 12, wherein the bay is accessible by the drone with the loaded package through an aperture in a panel of the AV.

18. The system of claim 17, wherein the panel is a roof panel, the system further comprising a door covering the aperture in a closed position, the door openable to permit entry and exit of the drone with the loaded package, respectively to and from the bay.

19. The system of claim 1, wherein the drone is powered by at least one of a battery and a combustible fuel.

20. A system comprising
a drone with a package loaded thereon, the drone having autonomous drive capability,
an assist vehicle (AV) for transporting the drone with the loaded package in an assisted drive mode, and
control hardware and software for setting a route to autonomously fly the drone with the loaded package over a first mile section of a route and over a last mile section of the route, and to carry the drone with the loaded package in the assisted drive mode over a third section of the route intermediate the first mile section and the last mile section.

21. A method comprising
autonomously flying a drone with a package loaded thereon over a first mile section of a route,
autonomously flying the drone with the loaded package over a last mile section of the route,
at an end of the first mile section, landing the drone with the loaded package at an AV,
at a beginning of the last mile section, launching the drone with the loaded package from the AV, and
the AV transporting the drone with the loaded package over a third section of the route, intermediate the first mile section and the last mile section.

* * * * *